United States Patent
Tu et al.

(10) Patent No.: US 9,712,208 B2
(45) Date of Patent: Jul. 18, 2017

(54) METHOD AND APPARATUS FOR TRAINING VECTOR COEFFICIENT OF VECTORED DIGITAL SUBSCRIBER LINE

(71) Applicant: HUAWEI TECHNOLOGIES CO., LTD., Shenzhen, Guangdong (CN)

(72) Inventors: Jianping Tu, Shenzhen (CN); Jie Lv, Wuhan (CN); Xiang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 230 days.

(21) Appl. No.: 14/611,553

(22) Filed: Feb. 2, 2015

(65) Prior Publication Data

US 2015/0146868 A1    May 28, 2015

Related U.S. Application Data

(63) Continuation of application No. PCT/CN2012/079665, filed on Aug. 3, 2012.

(51) Int. Cl.
*H04B 3/32* (2006.01)
*H04L 25/02* (2006.01)

(52) U.S. Cl.
CPC .......... *H04B 3/32* (2013.01); *H04L 25/0224* (2013.01)

(58) Field of Classification Search
None
See application file for complete search history.

(56) References Cited

U.S. PATENT DOCUMENTS

2008/0317035 A1    12/2008  Zhou et al.
2009/0271550 A1*   10/2009  Clausen ............... H04L 25/085
                                                         710/269

(Continued)

FOREIGN PATENT DOCUMENTS

CN         101453245       6/2009
CN         102301612      12/2011
WO      WO 2011/100927    8/2011

OTHER PUBLICATIONS

International Search Report mailed May 16, 2013, in corresponding International Patent Application No. PCT/CN2012/079665.

(Continued)

*Primary Examiner* — Fan Tsang
*Assistant Examiner* — Jeffrey Lytle
(74) *Attorney, Agent, or Firm* — Staas & Halsey LLP

(57) ABSTRACT

The present invention provides a method and an apparatus for training a Vector coefficient of a vectored digital subscriber line, where the method includes: after a handshake phase is executed for a joining line, calculating, by using a pilot estimation method, an initial precoding coefficient and an initial cancellation coefficient that represent interference from the joining line to a normal working line; and after a channel discovery phase is executed for the joining line, compensating the initial precoding coefficient and the initial cancellation coefficient by using a compensation factor, to obtain a precoding coefficient and a cancellation coefficient that represent the interference from the joining line to the normal working line, wherein the compensation factor is obtained according to a signal power change or a signal phase change of the joining line. The present invention improves efficiency of Vector coefficient training.

12 Claims, 14 Drawing Sheets

(56) References Cited

U.S. PATENT DOCUMENTS

2009/0296792 A1   12/2009  Fang
2012/0224685 A1    9/2012  Schenk et al.
2013/0235915 A1    9/2013  Wang et al.

OTHER PUBLICATIONS

International Search Report mailed on May 16, 2013 in corresponding International Patent Application No. PCT/CN2012/079665.
Alcatel-Lucent, "G.vector: Combined Scheme for Frequency-Dependent Pilot Modulation", ITU-T SG15/Q4 contribution T09XC-026, Xi'An, China Jul. 2009.
Assia, "G.vector: A Proposal for Frequency Division Multiplexing of Orthogonal Pilot Sequences", ITU-T SG15/Q4 contribution 09GS-079, Geneva, Switzerland, May 2009.
Recommendation ITU-T G.992.3, Series G: Transmission Systems and Media, Digital Systems and Networks, Digital sections and digital line system—Access networks, "Asymmetric digital subscriber line transceivers 2 (ADSL2)", Apr. 2009.
Recommendation ITU-T G.993.2, Series G: Transmission Systems and Media, Digital Systems and Networks, Digital sections and digital line system—Access networks, "Very high speed digital subscriber line transceivers 2 (VDSL2)", Dec. 2011.
Recommendation ITU-T G.993.5, Series G: Transmission Systems and Media, Digital Systems and Networks, Digital sections and digital line system—Access networks, "Self-FEXT cancellation (vectoring) for use with VDSL2 transceivers", Apr. 2010.
Recommendation ITU-T G.994.1, Series G: Transmission Systems and Media, Digital Systems and Networks, Digital sections and digital line system—Access networks, "Handshake procedures for digital subscriber line transceivers", Jun. 2012.

* cited by examiner

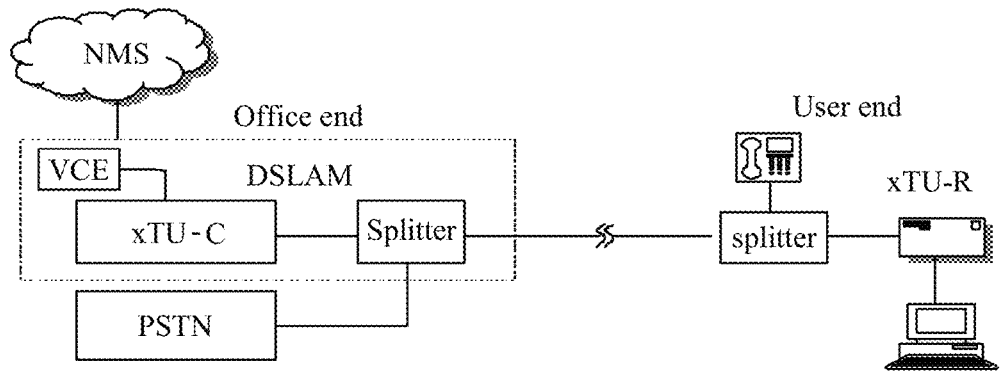

FIG. 2

| After a handshake phase is executed for a newly-added line, calculate, by using a pilot estimation method, an initial precoding coefficient and an initial cancellation coefficient that represent interference from the newly-added line to a normal working line | ─301 |

| After a channel discovery phase is executed for the newly-added line, perform compensation on the initial precoding coefficient and the initial cancellation coefficient by using a compensation factor, to obtain a precoding coefficient and a cancellation coefficient that represent the interference from the newly-added line to the normal working line, where the compensation factor is obtained according to a signal power change or a signal phase change of the newly-added line | ─302 |

FIG. 3

METHOD AND APPARATUS FOR TRAINING VECTOR COEFFICIENT OF VECTORED DIGITAL SUBSCRIBER LINE

CROSS-REFERENCE TO RELATED APPLICATIONS

This application is a continuation of International Application No. PCT/CN2012/079665, filed on Aug. 3, 2012, which is hereby incorporated by reference in its entirety.

TECHNICAL FIELD

The present invention relates to communications technologies, and in particular, to a method and an apparatus for training a Vector coefficient of a vectored digital subscriber line.

BACKGROUND

An xDSL is a high-speed data transmission technology over a telephone twisted-pair cable. A central office of an xDSL system, that is, a digital subscriber line access multiplexer (Digital Subscriber Line Access Multiplexer, DSLAM for short), provides access for multiple xDSL signals. Due to an electromagnetic induction principle, mutual interference is generated between the multiple signals, which is referred to as crosstalk. Far-end crosstalk (Far-end Crosstalk, FEXT for short) has relatively large impact on transmission performance of a line. To ensure a channel transmission rate, cancellation processing needs to be performed on the FEXT. Currently, a vectored digital subscriber line (Vectored-DSL) technology is proposed in the industry, which is mainly used to perform joint signal processing at a DSLAM end to eliminate FEXT interference.

In the prior art, signal processing performed at a central office in the Vectored-DSL is as follows: according to a channel transmission equation $y=Hx+n$, for a received upstream signal, after the signal processing is performed at the central office, the received signal is $y=W(Hx+n)=WHx+Wn$, where H is a channel matrix that is used to represent a mutual interference relationship between multiple signals, y is a channel output vector, x is a channel input vector, n is a noise vector, W is a cancellation matrix, and when WH is a diagonal matrix, an FEXT of the received signal is cancelled; for a to-be-sent downstream signal, after the signal processing is performed at the central office, the sent signal is $x_1=Px$, where P is a precoding matrix, so that a received signal obtained by a customer premises equipment is $y=Hx_1+n=HPx+n$, and when HP is a diagonal matrix, the FEXT of the received signal is cancelled. It can be seen that, a key of the signal processing of the Vectored-DSL is to determine the precoding matrix P and the cancellation matrix W, so that FEXT cancellation processing is performed on a signal according to P and W. P and W are determined through estimation during an initialization process of the DSLAM. For example, when a new line is added to the xDSL system, the DSLAM performs the initialization process again to update P and W, and after P and W are determined, activation of the DSLAM is completed and the DSLAM starts to work normally. The foregoing precoding matrix P and the cancellation matrix W are actually formed by multiple corresponding coefficients that are used to represent a mutual interference relationship between lines. For example, the precoding matrix P includes a precoding coefficient that represents interference from line 1 to line 2, and the cancellation matrix W includes a cancellation coefficient that represents the interference from line 1 to line 2. An estimation of P and W actually is an estimation of the precoding matrix and the cancellation matrix thereof. Therefore, the foregoing process of estimating P and W may be referred to as Vector coefficient training, where the Vector coefficient refers to the precoding coefficient and the cancellation coefficient.

FIG. 1 is a schematic flowchart of a method for training a Vector coefficient of a vectored digital subscriber line according to the prior art. As shown in FIG. 1, a new joining line is used as an example. In this case, the central office mainly updates a coefficient related to the joining line, of the existing P and W, such as a precoding coefficient and a cancellation coefficient that represent interference from the joining line (referred to as a joining line) to an existing normal working line (referred to as a showtime line), and a precoding coefficient and a cancellation coefficient that represent interference from another line to the joining line. Current Vector coefficient training includes: the first coefficient estimation performed after a handshake phase of the central office and a customer premises equipment, where the first coefficient estimation includes an OP-VECTOR 1 and an RP-VECTOR1, an OP phase is used to estimate a precoding coefficient, and an RP phase is used to estimate a cancellation coefficient; the second coefficient estimation performed after a channel discovery phase of the central office and the customer premises equipment, where the second coefficient estimation includes an OP-VECTOR 1-1 and an RP-VECTOR1-1; and the third coefficient estimation performed after a training phase of the central office and the customer premises equipment, where the third coefficient estimation includes an OP-VECTOR2, an RP-VECTOR 1-2, an OP-VECTOR2-1, and an RP-VECTOR 2. The first two estimations are performed to estimate a coefficient that represents interference from a joining line to a showtime line twice, and the third estimation is performed to estimate a coefficient that represents interference from another line to the joining line. However, a regular estimation method is adopted for each estimation, such as an orthogonal pilot sequence method, and time required for the orthogonal pilot sequence estimation method multiplies as a system scale increases. For example, when there are 288 lines in a system, time required to activate a central office is about three minutes, which is hard to be accepted by an operator and a user, and therefore, user experience is very poor.

SUMMARY

The present invention provides a method and an apparatus for training a Vector coefficient of a vectored digital subscriber line to improve efficiency of Vector coefficient training and shorten time of coefficient training when a new line is added.

One aspect of the present invention provides a method for training a Vector coefficient of a vectored digital subscriber line, including:

after a handshake phase is executed for a joining line, calculating, by using a pilot estimation method, an initial precoding coefficient and an initial cancellation coefficient that represent interference from the joining line to a normal working line; and after a channel discovery phase is executed for the joining line, compensating the initial precoding coefficient and the initial cancellation coefficient by using a compensation factor, to obtain a precoding coefficient and a cancellation coefficient that represent the interference from the joining line to the normal working line, where the compensation factor is obtained according to a signal power change or a signal phase change of the joining line.

In one possible implementation manner, before a training phase is executed for the joining line, the compensating the initial precoding coefficient and the initial cancellation coefficient by using a compensation factor includes: separately compensating the initial precoding coefficient and the initial cancellation coefficient by using a first power adjustment compensation factor, to obtain the precoding coefficient and the cancellation coefficient that represent the interference from the joining line to the normal working line, where the first power adjustment compensation factor is obtained according to a signal power change of the joining line occurring before the channel discovery phase and after the channel discovery phase.

In another possible implementation manner, after the training phase is executed for the joining line, the compensating the initial precoding coefficient and the initial cancellation coefficient by using a compensation factor includes: compensating the initial cancellation coefficient by using a first phase adjustment compensation factor, to obtain the cancellation coefficient that represents the interference from the joining line to the normal working line, where the first phase adjustment compensation factor is obtained according to a signal phase change of the joining line occurring before the training phase and after the training phase.

Another aspect of the present invention provides a method for training a Vector coefficient of a Vectored-DSL, including:

after a training phase is executed for a joining line, acquiring a historical precoding coefficient and a historical cancellation coefficient that represent interference from another line to the joining line; and compensating the historical precoding coefficient and the historical cancellation coefficient by using a compensation factor, to obtain a precoding coefficient and a cancellation coefficient that represent the interference from the another line to the joining line, where the compensation factor is obtained according to a change between a current parameter of the joining line and a historical parameter of the joining line, and the parameter includes a power parameter and a phase parameter.

In one possible implementation manner, the compensating the historical precoding coefficient and the historical cancellation coefficient by using a compensation factor includes: compensating the historical precoding coefficient by using a second power adjustment compensation factor and/or a second phase adjustment compensation factor, to obtain the precoding coefficient that represents the interference from the another line and the joining line; and/or compensating the historical cancellation coefficient by using a second power adjustment compensation factor and/or a second phase adjustment compensation factor, to obtain the cancellation coefficient that represents the interference from the another line and the joining line, where the second power adjustment compensation factor is obtained according to a change between a current power parameter of the joining line and a historical power parameter of the joining line, and the second phase adjustment compensation factor is obtained according to a change between a current phase parameter of the joining line and a historical phase parameter of the joining line.

In another possible implementation manner, after the training phase is executed for the joining line, the method further includes: compensating, by using a first phase adjustment compensation factor, an initial cancellation coefficient that represents interference from the joining line to a normal working line, to obtain a cancellation coefficient that represents the interference from the joining line to the normal working line, where the initial cancellation coefficient is obtained by calculation after a handshake phase is executed for the joining line, where the first phase adjustment compensation factor is obtained according to a signal phase change of the joining line occurring before the training phase and after the training phase.

In yet another possible implementation manner, after a channel discovery phase is executed and before the training phase is executed for the joining line, the method further includes: separately compensating, by using a first power adjustment compensation factor, an initial precoding coefficient and an initial cancellation coefficient that represent the interference from the joining line to the normal working line, to obtain a precoding coefficient and a cancellation coefficient that represent the interference from the joining line to a normal working line, where the initial precoding coefficient and the initial cancellation coefficient are obtained after the handshake phase is executed for the joining line, where the first power adjustment compensation factor is obtained according to a signal power change of the joining line occurring before the channel discovery phase and after the channel discovery phase.

Yet another aspect of the present invention provides an apparatus for training a Vector coefficient of a vectored digital subscriber line, including:

a coefficient calculating module, configured to: after a handshake phase is executed for a joining line, calculate, by using a pilot estimation method, an initial precoding coefficient and an initial cancellation coefficient that represent interference from the joining line to a normal working line; and a coefficient determining module, configured to: after a channel discovery phase is executed for the joining line, compensate the initial precoding coefficient and the initial cancellation coefficient by using a compensation factor, to obtain a precoding coefficient and a cancellation coefficient that represent the interference from the joining line to the normal working line, where the compensation factor is obtained according to a signal power change or a signal phase change of the joining line.

In one possible implementation manner, the coefficient determining module includes: a compensation factor unit, configured to obtain a first power adjustment compensation factor according to a signal power change of the joining line occurring before the channel discovery phase and after the channel discovery phase; and a coefficient compensating unit, configured to separately compensate the initial precoding coefficient and the initial cancellation coefficient by using the first power adjustment compensation factor that is determined by the compensation factor unit, to obtain the precoding coefficient and the cancellation coefficient that represent the interference from the joining line to the normal working line.

In another possible implementation manner, the compensation factor unit is further configured to obtain a first phase adjustment compensation factor according to a signal phase change of the joining line occurring before a training phase and after the training phase; and the coefficient compensating unit is further configured to compensate the initial cancellation coefficient by using the first phase adjustment compensation factor, to obtain the cancellation coefficient that represents the interference from the joining line to the normal working line.

Yet another aspect of the present invention provides an apparatus for training a Vector coefficient of a vectored digital subscriber line, including:

a coefficient acquiring module, configured to: after a training phase is executed for a joining line, acquire a historical precoding coefficient and a historical cancellation coefficient that represent interference from another line to the joining line; and a coefficient determining module, configured to compensate the historical precoding coefficient and the historical cancellation coefficient by using a compensation factor, to obtain a precoding coefficient and a cancellation coefficient that represent the interference from the another line to the joining line, where the compensation factor is obtained according to a change between a current parameter of the joining line and a historical parameter of the joining line, and the parameter includes a power parameter and a phase parameter.

In one possible implementation manner, the coefficient determining module includes: a compensation factor unit, configured to obtain a second power adjustment compensation factor according to a change between a current power parameter of the joining line and a historical power parameter of the joining line, and obtain a second phase adjustment compensation factor according to a change between a current phase parameter of the joining line and a historical phase parameter of the joining line; and a coefficient compensating unit, configured to compensate the historical precoding coefficient by using the second power adjustment compensation factor and/or the second phase adjustment compensation factor, to obtain the precoding coefficient that represents the interference from the another line to the joining line; and/or compensate the historical cancellation coefficient by using the second power adjustment compensation factor and/or the second phase adjustment compensation factor, to obtain the cancellation coefficient that represents the interference from the another line to the joining line.

Technical effects of the method and apparatus for training a Vector coefficient of a vectored digital subscriber line provided by the present invention are as follows: After the channel discovery phase is executed for the joining line, the initial precoding coefficient and the initial cancellation coefficient are compensated by using a compensation factor, to obtain the precoding coefficient and the cancellation coefficient that represent the interference from the joining line to the normal working line; or the historical precoding coefficient and the historical cancellation coefficient are compensated by using a compensation factor, to obtain the precoding coefficient and the cancellation coefficient that represent the interference from the another line to the joining line. Compared with a manner of repeatedly calculating the related coefficient for multiple times in the prior art, entire time of Vector coefficient training can be shortened and efficiency of the Vector coefficient training can be improved.

BRIEF DESCRIPTION OF DRAWINGS

FIG. 2 is an architecture diagram of an application system of a method for training a Vector coefficient of a Vectored-DSL according to the present invention;

FIG. 3 is a schematic flowchart of an embodiment of a method for training a Vector coefficient of a Vectored-DSL according to the present invention;

DESCRIPTION OF EMBODIMENTS

Figure 1:
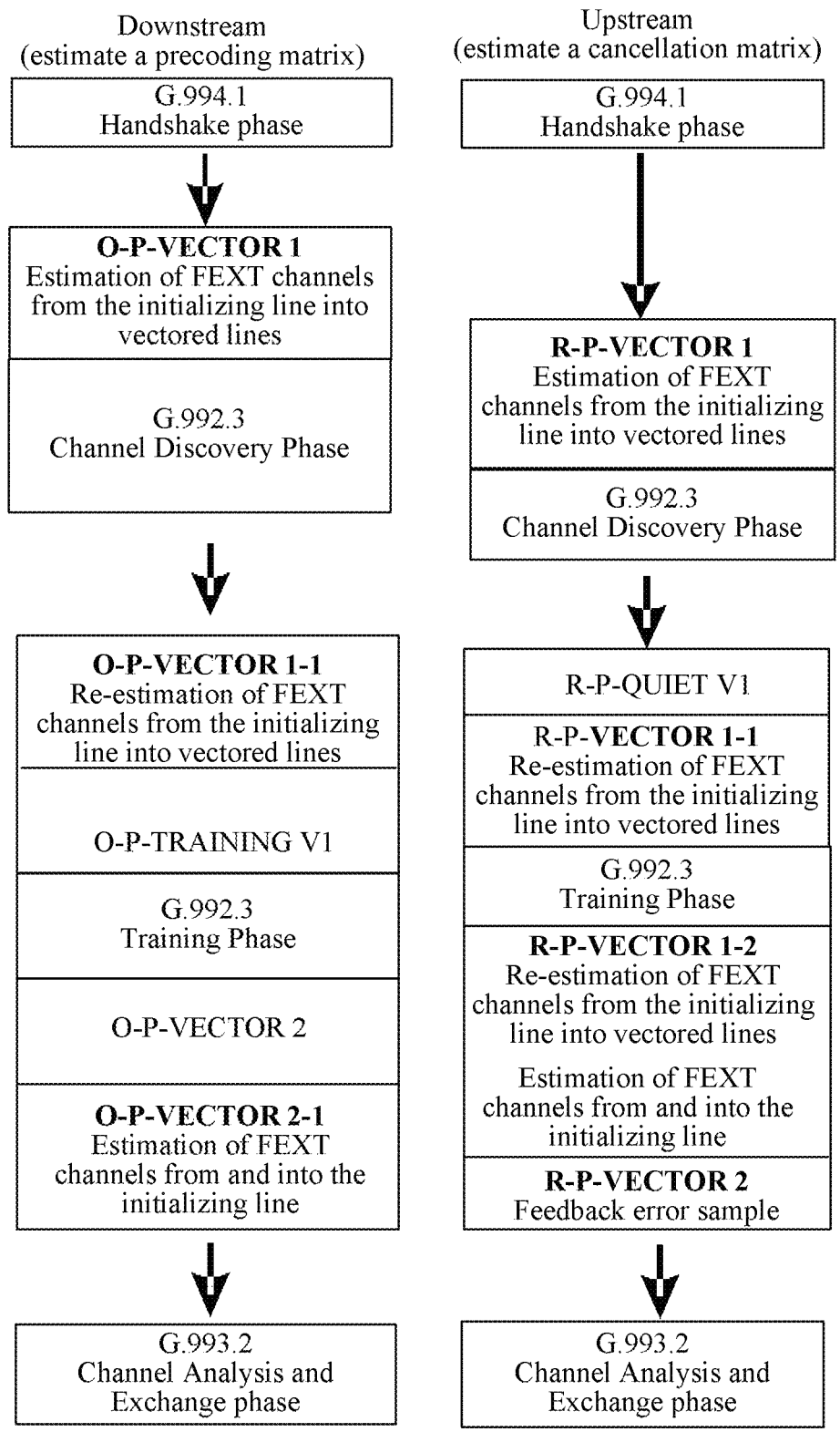
FIG. 1 is a schematic flowchart of a method for training a Vector coefficient of a vectored digital subscriber line according to the prior art.

A method for training a Vector coefficient of a Vectored-DSL in an embodiment of the present invention is applied to a Vectored-DSL system. FIG. 2 is an architecture diagram of an application system of the method for training a Vector coefficient of a Vectored-DSL according to the present invention. As shown in FIG. 2, the system includes a central office and a customer premises equipment, and a DSLAM located at the central office may allow access of multiple xDSL signals. In addition, the Vectored-DSL system uses a same twisted-pair cable with a public switched telephone network system (Public Switched Telephone Network, PSTN for short) to transmit signals. For example, for upstream signals, after a splitter (Splitter) in the DSLAM separates a PSTN signal and an xDSL signal, the xDSL signal is received by a transceiver xTU-C in the DSLAM.

In this embodiment, the DSLAM further includes a vectoring control entity (Vectoring Control Entity, VCE for short). An FEXT exists in the multiple signals that are received by the transceiver xTU-C, and the VCE performs FEXT cancellation processing on the signals. When a downstream signal is sent, the VCE also performs the FEXT cancellation processing on the to-be-sent signal, and then the transceiver xTU-C is responsible for the sending. Therefore, the method for training a Vector coefficient in this embodiment of the present invention is actually executed by the VCE. The VCE is responsible for determining a precoding matrix and a cancellation matrix that are required for signal processing, and performing processing on the received upstream signal or the to-be-sent downstream signal according to the precoding matrix and the cancellation matrix.

For the method for training a Vector coefficient, this embodiment is mainly provided for Vector coefficient training executed when a new line is added in the system, so as to shorten a training process, accelerate activation of the DSLAM, enable the DSLAM to start working normally as soon as possible, and avoid that a user has to wait for a long time. The VCE mainly executes the training process in an initialization process of the DSLAM, and in addition, the training process mainly includes three training phases:

Phase 1: After the DSLAM and a user-end device that corresponds to a joining line execute a handshake phase (Handshake phase), a phase of estimating a precoding coefficient and a cancellation coefficient that represent interference from a joining line to a showtime line includes OP-VECTOR 1 and RP-VECTOR1;

Phase 2: After the DSLAM and the user-end device that corresponds to the joining line execute a channel discovery phase (Channel Discovery Phase), a phase of re-determining, that is, updating the precoding coefficient and the cancellation coefficient that represent the interference from the joining line to the showtime line includes OP-VECTOR 1-1 and RP-VECTOR1-1 that are before a training phase (Training Phase), and a part of RP-VECTOR 1-2 that is after the training phase; and Phase 3: After the DSLAM and the user-end device that corresponds to the joining line execute the training phase (Training Phase), a phase of determining a precoding coefficient and a cancellation coefficient that represent interference from another line to the joining line includes the other part of RP-VECTOR 1-2 and OP-VECTORE2-1.

According to the method for training a Vector coefficient in the embodiments of the present invention, phase 1 keeps unchanged and a regular estimation method is still used, such as a pilot allocation estimation method, to calculate the precoding coefficient and the cancellation coefficient that represent the interference from the joining line to the showtime line; improvements are made mainly for phase 2 and phase 3 to reduce use of the regular estimation method as much as possible in these two phases, that is, the allocation pilot estimation method is no longer used to calculate a related coefficient, instead, a more rapid method is used to determine a coefficient, so as to shorten entire time for training a Vector coefficient; and the more rapid method specifically includes partly using the regular estimation method or not using the regular estimation method in these two phases.

In addition, it should be noted that, a name of an execution phase mentioned in each embodiment of the present invention, such as RP-VECTOR 1-2 or OP-VECTOR 1, is merely used as an identifier of the phase. In a specific implementation, the name is not limited, and another name may also be used to identify the phase.

The following describes the method for training a Vector coefficient in the embodiments of the present invention in detail.

Embodiment 1

FIG. 3 is a schematic flowchart of an embodiment of a method for training a Vector coefficient of a Vectored-DSL according to the present invention. As shown in FIG. 3, the method may include:

301. After a handshake phase is executed for a joining line, calculate, by using a pilot estimation method, an initial precoding coefficient and an initial cancellation coefficient that represent interference from the joining line to a normal working line.

In a Vectored-DSL system, multiple lines are included. A part of the lines probably belongs to the joining line. For example, a central office redistributes a line to a user who was online or a customer premises equipment restarts, and all these make the line be added to the system again, where the line is equivalent to the joining line. A part of the lines probably have been in a normal working state, and this part of the lines may be referred to as a showtime line, where devices at both ends corresponding to the line have completed an initialization process and start to normally transmit data. Another part of the lines probably is in the initialization process, and the like.

In this embodiment, in a case in which there is a showtime line in the system, the joining line, namely a joining line, cannot cause severe impact on the showtime line, so as to ensure performance and stability of the showtime line in an existing network. Therefore, it is required to update a coefficient related to the joining line in a precoding matrix and a cancellation matrix, so as to more accurately cancel an FEXT of the showtime line. In addition, in this embodiment, a process of training the coefficient related to the joining line needs to be completed more rapidly to ensure system stability of the existing network, reduce waiting time of a new online user, and enhance online experience of the user.

The pilot estimation method is a regular estimation method, such as an orthogonal pilot sequence estimation.

302. After a channel discovery phase is executed for the joining line, compensate the initial precoding coefficient and the initial cancellation coefficient by using a compensation factor, to obtain a precoding coefficient and a cancellation coefficient that represent the interference from the joining line to the normal working line, where the compensation factor is obtained according to a signal power change or a signal phase change of the joining line.

For example, a main reason for updating the precoding coefficient and the cancellation coefficient that represent the interference from the joining line to the normal working line in phase 2 is that, a coefficient determined in phase 1 changes because a signal power of the joining line in the channel discovery phase (Channel Discovery Phase) changes. Therefore, a power adjustment compensation factor may be determined according to the signal power change, and the coefficient in phase 1 is adjusted to obtain a correct coefficient, which greatly improves the training efficiency compared with the regular estimation method.

For another example, after a training phase (Training Phase), the coefficient determined in phase 1 changes because a signal phase of the joining line in the training phase may also change. Therefore, a phase adjustment compensation factor may be determined according to the signal phase change, and the coefficient in phase 1 is adjusted to obtain a correct coefficient, which greatly improves the training efficiency compared with the regular estimation method.

For the compensation in the foregoing two phases, only one type of compensation thereof may be independently executed, or both types of compensation are executed.

Embodiment 2

Figure 4:
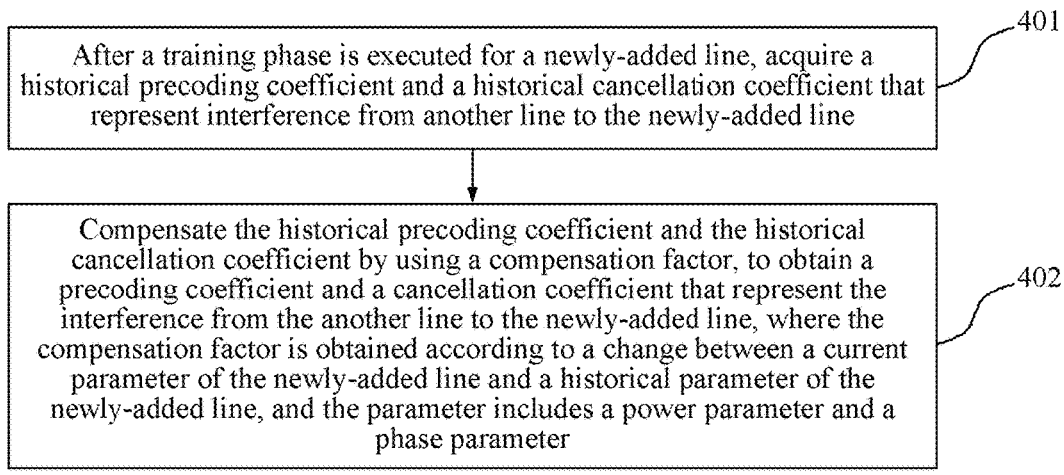
FIG. 4 is a schematic flowchart of another embodiment of a method for training a Vector coefficient of a Vectored-DSL according to the present invention.

FIG. 4 is a schematic flowchart of another embodiment of a method for training a Vector coefficient of a Vectored-DSL according to the present invention. As shown in FIG. 4, the method may include:

401. After a training phase is executed for a joining line, acquire a historical precoding coefficient and a historical cancellation coefficient that represent interference from another line to the joining line.

402. Compensate the historical precoding coefficient and the historical cancellation coefficient by using a compensation factor, to obtain a precoding coefficient and a cancellation coefficient that represent the interference from the another line to the joining line, where the compensation factor is obtained according to a change between a current parameter of the joining line and a historical parameter of the joining line, and the parameter includes a power parameter and a phase parameter.

For example, when the precoding coefficient and the cancellation coefficient that represent the interference from the another line to the joining line are determined in phase 3, if the joining line has a related historical coefficient available when the joining line was on line before, based on the historical coefficient, a historical coefficient change can be compensated by using a power adjustment compensation factor and a phase adjustment compensation factor.

For another example, when the precoding coefficient and the cancellation coefficient that represent the interference from the another line to the joining line are determined in phase 3, a related historical coefficient of the joining line available when the joining line was on line before may be directly used as a currently determined coefficient that represents the interference from the another line to the joining line, and the coefficient may be adjusted during subsequent channel tracking and update of the joining line. There are only some amplitude and phase deviations between the historical factor and an actual correct coefficient, and an effect of cancellation achieved by using the historical coefficient is slightly poor, because some remaining crosstalk may exist, which may be resolved by subsequent tracking and update. This case is equivalent to that the compensation factor is 1 or no compensation is performed.

For another example, upstream and downstream FEXT cancellation processing may also not be performed on the joining line temporarily, that is, it is equivalent to that a step of determining the coefficient that represents the interference from the another line to the joining line in phase 3 is directly omitted. Because the joining line is the joining line, the coefficient may be adjusted during subsequent channel tracking and update of the joining line. Even if cancellation is not performed on the joining line, the joining line can also work normally, but at a relatively low rate.

The foregoing merely lists several feasible manners of the first method in brevity, and the following gives a more detailed description of the method for training a Vector coefficient in the present invention separately by using multiple embodiments.

Embodiment 3

Figure 5:
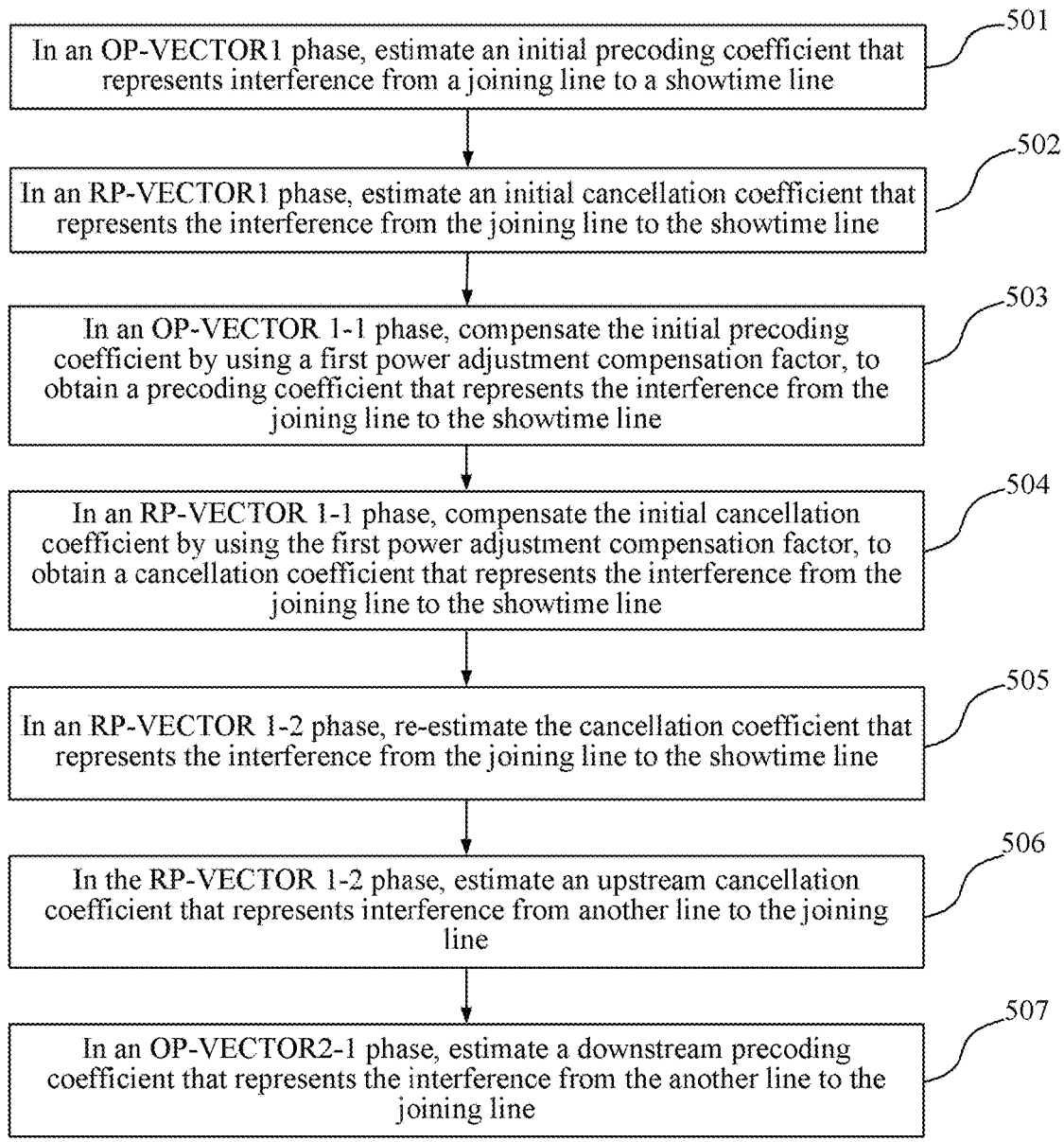
FIG. 5 is a schematic flowchart of yet another embodiment of a method for training a Vector coefficient of a Vectored-DSL according to the present invention.

FIG. 5 is a schematic flowchart of yet another embodiment of a method for training a Vector coefficient of a Vectored-DSL according to the present invention. In this embodiment, when a precoding coefficient and a cancellation coefficient that represent interference from a joining line to a showtime line are updated in phase 2, re-estimation is no longer performed. Instead, a coefficient that represents the interference from the joining line to the showtime line is obtained after compensation is performed on a coefficient in phase 1 by using a power compensation factor.

As shown in FIG. 5, the method may include:

501. In an OP-VECTOR1 phase, estimate a precoding coefficient that represents interference from a joining line to a showtime line.

A regular estimation method is still used in this phase, for example, a pilot allocation estimation is used. In this case, the precoding coefficient may be referred to as an initial precoding coefficient.

502. In an RP-VECTOR1 phase, estimate a cancellation coefficient that represents the interference from the joining line to the showtime line. In this case, the cancellation coefficient may be referred to as an initial cancellation coefficient.

The foregoing step 501 and step 502 are executed after a handshake phase and before a channel discovery phase, where the handshake phase and the channel discovery phase are executed by the devices at both ends of the joining line.

503. In an OP-VECTOR 1-1 phase, compensate an initial precoding coefficient by using a first power adjustment compensation factor, to obtain a precoding coefficient that represents the interference from the joining line to the showtime line.

The OP-VECTOR 1-1 phase is a phase executed after the channel discovery phase and before a training phase, where the channel discovery phase and the training phase are executed by the devices at both ends of the joining line.

In this embodiment, a coefficient that represents the interference from the joining line to the showtime line in the OP-VECTOR 1-1 phase is updated; the coefficient needs to be updated because a signal power of the joining line changes in the channel discovery phase. Based on this, in this embodiment, a power adjustment compensation factor is determined according to the signal power change of the joining line occurring before the channel discovery phase and after the channel discovery phase, and may be referred to as the first power adjustment compensation factor (a reason for naming the power adjustment compensation factor as the first power adjustment compensation factor is to differentiate it from another power adjustment compensation factor in the following embodiment).

Figure 6:
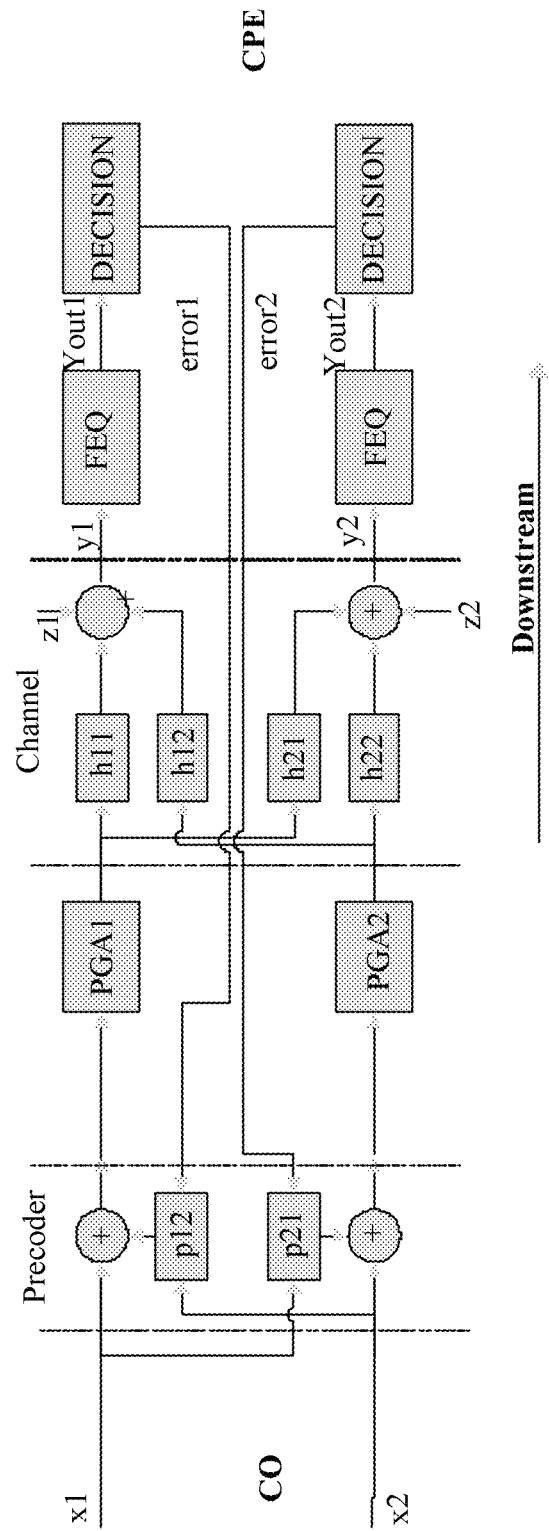
FIG. 6 is a schematic diagram of a precoding model of another embodiment of a method for training a Vector coefficient of a Vectored-DSL according to the present invention.

Specifically, referring to FIG. 6, FIG. 6 is a schematic diagram of a precoding model of another embodiment of a method for training a Vector coefficient of a Vectored-DSL according to the present invention. The precoding model mainly shows a signal transmission procedure from a central office (CO) to a customer premises equipment (CPE), where, in an example, x1 represents a signal sending source of line 1, x2 represents a signal sending source of line 2, line 1 is a showtime line, line 2 is a joining line, $h_{11}$ and $h_{22}$ respectively are line attenuation of line 1 and line 2, $h_{12}$ represents a crosstalk channel from line 2 to line 1, $h_{21}$ represents a crosstalk channel from line 1 to line 2, $PGA_1$ and $PGA_2$ respectively are a programmable gain adjuster (Programmable Gain Adjuster, PGA for short) of line 1 and line 2, and $P_{12}$ represents the precoding coefficient that represents the interference from the joining line to the showtime line.

The precoding coefficient that represents the interference from the joining line to the showtime line may be obtained from the precoding model, which is:

$$P_{12}^k = \frac{PGA_2 \cdot h_{12}^k}{PGA_1 \cdot h_{11}^k}, k = 1, 2, \ldots, N \quad (1)$$

where k represents a subcarrier, and N is the number of subcarriers.

A power change occurring in the channel discovery phase is actually that a parameter PGA changes, and the PGA on the joining line, namely PGA2, changes. Therefore, in the foregoing formula (1), because PGA2 changes, a defined precoding coefficient $P_{12}$ that represents the interference from the joining line to the showtime line changes, then it is determined that the first power adjustment compensation factor is $g_{Tx}$:

$$g_{Tx} = PGA_2$$

Based on this, it is assumed that power before the change is $PGA_2^{old}$ and power after the change is $PGA_2^{new}$. Then the initial precoding coefficient, namely $P_{12}$ before the change, is compensated by using the first power adjustment compensation factor, to obtain a newest precoding coefficient that represents the interference from the joining line to the showtime line, which is $P_{12}^{new}$ (namely $P_{12}^{k,new}$, where k represents a subcarrier, and for each subcarrier, calculation is performed according to a same formula, and therefore, k is omitted in the following description):

$$\tilde{P}_{12}^k = \frac{1}{g_{Tx}^{old}} \cdot P_{12}^{k,old}, k = 1, 2, \ldots, N \quad (2)$$

$$P_{12}^{k,new} = g_{Tx}^{new} \cdot \tilde{P}_{12}^k, k = 1, 2, \ldots, N$$

where $P_{12}^{old}$ represents a precoding coefficient before an adjustment, $g_{Tx}^{old}$ is $PGA_2^{old}$, and $g_{Tx}^{new}$ is $PGA_2^{new}$.

504. In an RP-VECTOR 1-1 phase, compensate the initial cancellation coefficient by using the first power adjustment compensation factor, to obtain a cancellation coefficient that represents the interference from the joining line to the showtime line.

The RP-VECTOR 1-1 phase is also a phase executed after the channel discovery phase and before the training phase and is for upstream direction training, where the channel discovery phase and the training phase are executed by the devices at both ends of the joining line.

Figure 7:
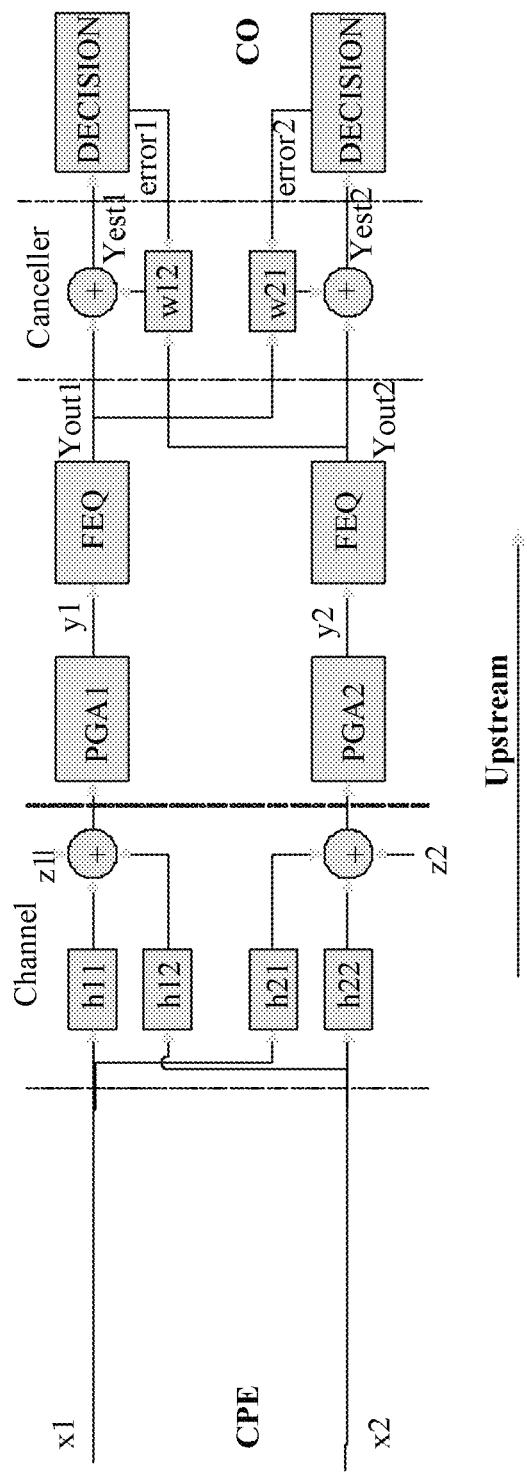
FIG. 7 is a schematic diagram of a cancellation model of another embodiment of a method for training a Vector coefficient of a Vectored-DSL according to the present invention.

In this embodiment, based on a same principle, the coefficient needs to be updated because the signal power of the joining line changes in the channel discovery phase, and therefore, the first power adjustment compensation factor is determined according to the signal power change of the joining line occurring before the channel discovery phase and after the channel discovery phase. Referring to FIG. 7, FIG. 7 is a schematic diagram of a cancellation model of another embodiment of a method for training a Vector coefficient of a Vectored-DSL according to the present invention. The cancellation model mainly shows a signal transmission procedure from a customer premises equipment (CPE) to a central office (CO), where, in an example, x1 and x2 represent two lines, one is a joining line, and the other is a showtime line. The cancellation coefficient that represents the interference from the joining line to the showtime line may be obtained from the cancellation model, which is:

$$W_{12}^k = \frac{h_{12}^k \cdot PGA_1}{h_{22}^k \cdot PGA_2}, k = 1, 2, \ldots, N \quad (3)$$

In the cancellation model, a power change occurring in the channel discovery phase is actually that a parameter PGA changes. That is, because $PGA_2$ in the foregoing formula changes, a defined cancellation coefficient $W_{12}$ that represents the interference from the joining line to the showtime line changes, then it is determined that the first power adjustment compensation factor is $g_{Rx}$:

$$g_{Rx} = PGA_2$$

Based on this, it is assumed that power before the change is $PGA_2^{old}$ and power after the change is $PGA_2^{new}$. Then the initial cancellation coefficient, namely $W_{12}$ before the change, is compensated by using the first power adjustment compensation factor, to obtain a newest cancellation coefficient $W_{12}^{new}$ that represents the interference from the joining line to the showtime line, which is:

$$\tilde{W}_{12}^k = W_{12}^{k,old} \cdot g_{Rx}^{old}, k = 1, 2, \ldots, N \quad (4)$$

$$W_{12}^{k,new} = \tilde{W}_{12}^k \cdot \frac{1}{g_{Rx}^{new}}, k = 1, 2, \ldots, N$$

where $W_{12}^{old}$ represents a cancellation coefficient before an adjustment, $g_{Rx}^{old}$ is $PGA_2^{old}$, and $g_{Rx}^{new}$ is $PGA_2^{new}$.

505. In an RP-VECTOR 1-2 phase, re-estimate the cancellation coefficient that represents the interference from the joining line to the showtime line.

The RP-VECTOR 1-2 phase occurs after the devices at two ends of the joining line execute the training phase (Training Phase). In the training phase, for an upstream direction, a signal phase of the joining line may also change, which causes an upstream cancellation coefficient that represents the interference from the joining line to the showtime line to change, and therefore, the cancellation coefficient needs to be re-estimated in the RP-VECTOR 1-2 phase. The regular estimation method is used in this embodiment, for example, a pilot allocation estimation method is used to perform re-estimation.

506. In the RP-VECTOR 1-2 phase, estimate an upstream cancellation coefficient that represents interference from another line to the joining line.

After the joining line is added to a system, not only a related coefficient that represents the interference from the joining line to the showtime line changes, but also a related coefficient that represents interference from all other lines in the system except the joining line itself to the joining line also changes. To more accurately perform FEXT cancellation processing on a signal of a joining line subsequently, estimation is also performed on the upstream cancellation coefficient that represents the interference from the another line to the joining line in this embodiment, and the regular estimation method is also used.

507. In an OP-VECTOR2-1 phase, estimate a downstream precoding coefficient that represents the interference from the another line to the joining line.

In this embodiment, after the VCE completes determining of the related coefficient that represents the interference from the joining line to the showtime line and determining of the related coefficient that represents the interference from the another line to the joining line, updating of a precoding matrix and a cancellation matrix after the joining line gets online is completed. The devices at both ends of the joining line enter a showtime working state, the joining line becomes a showtime line, and the VCE may perform FEXT cancellation processing on a signal during normal working according to the precoding matrix and the cancellation matrix.

In addition, no coefficient is calculated in an OP-VECTOR2 phase and an RP-VECTOR2 phase, and these two phases are mainly used to exchange information required for calculating a coefficient.

According to the method for training a Vector coefficient in this embodiment, a manner of performing compensation update by using the first power adjustment compensation factor is used to update the related coefficient that represents the interference from the joining line to the showtime line in the OP-VECTOR 1-1 phase and the RP-VECTOR 1-1 phase. Unlike the prior art, pilot estimation does not need to be performed again, and therefore, efficiency of Vector coefficient training is improved.

Embodiment 4

Figure 8:
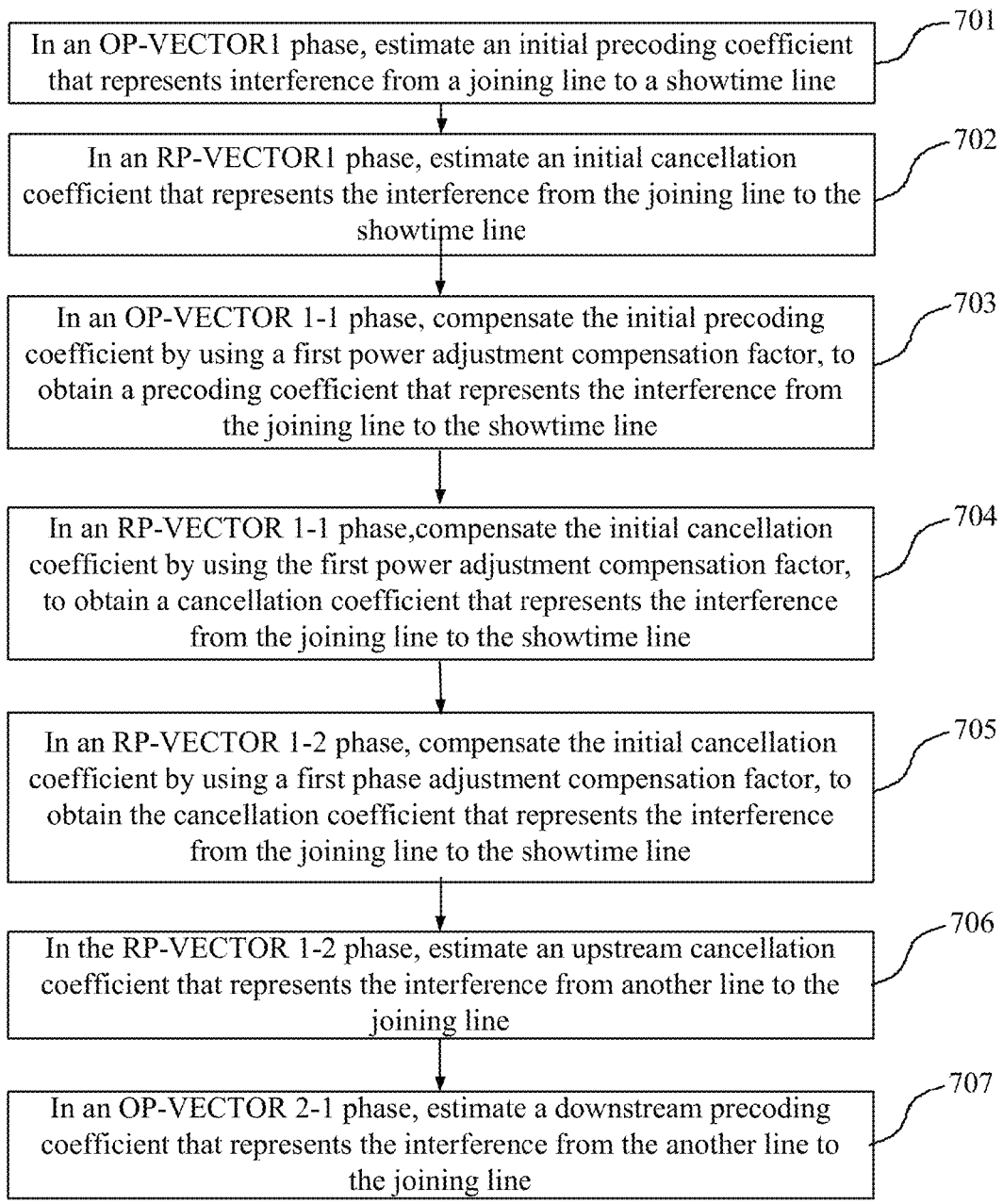
FIG. 8 is a schematic flowchart of yet another embodiment of a method for training a Vector coefficient of a Vectored-DSL according to the present invention.

FIG. 8 is a schematic flowchart of yet another embodiment of a method for training a Vector coefficient of a Vectored-DSL according to the present invention. In this embodiment, mainly based on the procedure shown in FIG. 5, a compensation update manner is also used for an upstream cancellation coefficient in an RP-VECTOR 1-2 phase.

For a procedure of this embodiment, reference may be made to the procedure shown in FIG. 8. A step that is the same as that of the procedure in FIG. 5 is not described in detail again, and only an improved step 705 added in this embodiment is described in detail.

701. In an OP-VECTOR1 phase, estimate a precoding coefficient that represents interference from a joining line to a showtime line.

702. In an RP-VECTOR1 phase, estimate a cancellation coefficient that represents the interference from the joining line to the showtime line. In this case, the cancellation coefficient may be referred to as an initial cancellation coefficient.

703. In an OP-VECTOR 1-1 phase, compensate an initial precoding coefficient by using a first power adjustment compensation factor, to obtain a precoding coefficient that represents the interference from the joining line to the showtime line.

704. In an RP-VECTOR 1-1 phase, compensate the initial cancellation coefficient by using the first power adjustment compensation factor, to obtain a cancellation coefficient that represents the interference from the joining line to the showtime line.

705. In an RP-VECTOR 1-2 phase, compensate the initial cancellation coefficient by using a first phase adjustment compensation factor, to obtain the cancellation coefficient that represents the interference from the joining line to the showtime line.

The RP-VECTOR 1-2 phase occurs after devices at two ends of the joining line execute a training phase (Training Phase). In the training phase, for an upstream direction, a signal phase of the joining line may change, which causes an upstream cancellation coefficient that represents the interference from the joining line to the showtime line to change. Therefore, the cancellation coefficient needs to be updated in the RP-VECTOR 1-2 phase.

The signal phase in the training phase (Training Phase) changes, which causes a defined cancellation coefficient $W_{12}$ that represents the interference from the joining line to the showtime line to change. It is assumed that an adjustment of timing advance (Timing Advance, TA for short) of the joining line makes a phase offset θ of an interference signal. Then the first phase adjustment compensation factor is:

$$\frac{1}{e^{j\theta}}$$

According to the cancellation model shown in FIG. 7, the cancellation coefficient $W_{12}$ that represents the interference from the joining line to the showtime line and is based on the signal phase may be obtained, which is:

$$W_{12}^{k,new} = \tilde{W}_{12}^{k} \cdot \frac{1}{g_{Rx}^{new}} \cdot \frac{1}{e^{j\theta}}, k = 1, 2, \ldots, N \quad (5)$$

706. In the RP-VECTOR 1-2 phase, estimate an upstream cancellation coefficient that represents interference from another line to the joining line.

707. In an OP-VECTOR2-1 phase, estimate a downstream precoding coefficient that represents the interference from the another line to the joining line.

According to the method for training a Vector coefficient in this embodiment, a compensation manner is used to update the upstream cancellation coefficient in the OP-VECTOR 1-1 phase, the RP-VECTOR 1-1 phase, and the RP-VECTOR 1-2 phase. Unlike the prior art, a pilot estimation does not need to performed again in these phases, and therefore, efficiency of Vector coefficient training is improved. In addition, compared with the procedure in FIG. 5, because the RP-VECTOR 1-2 phase is added, and a re-estimation manner is no longer used, time of Vector coefficient training is further shortened.

In addition, a feasible manner may also be used. For example, the compensation update manner may be used only for the upstream cancellation coefficient in the RP-VECTOR 1-2 phase, and a pilot estimation manner in the prior art is still used in the OP-VECTOR 1-1 phase and the RP-VECTOR 1-1 phase. In this case, training efficiency can be improved in the RP-VECTOR 1-2 phase compared with the prior art, and therefore, entire time for training a Vector coefficient can still be shortened. That is, in this embodiment, for multiple phases that need to update the coefficient in the Vector coefficient training, the foregoing compensation update can be used for independent improvement (for example, the compensation method is only used in the RP-VECTOR 1-2 phase), or the foregoing compensation update is used for any combination (for example, the compensation method is used in both the OP-VECTOR 1-1 phase and the RP-VECTOR 1-1 phase), or the like. All these can improve efficiency of the Vector coefficient training compared with the prior art.

Embodiment 5

Figure 9:
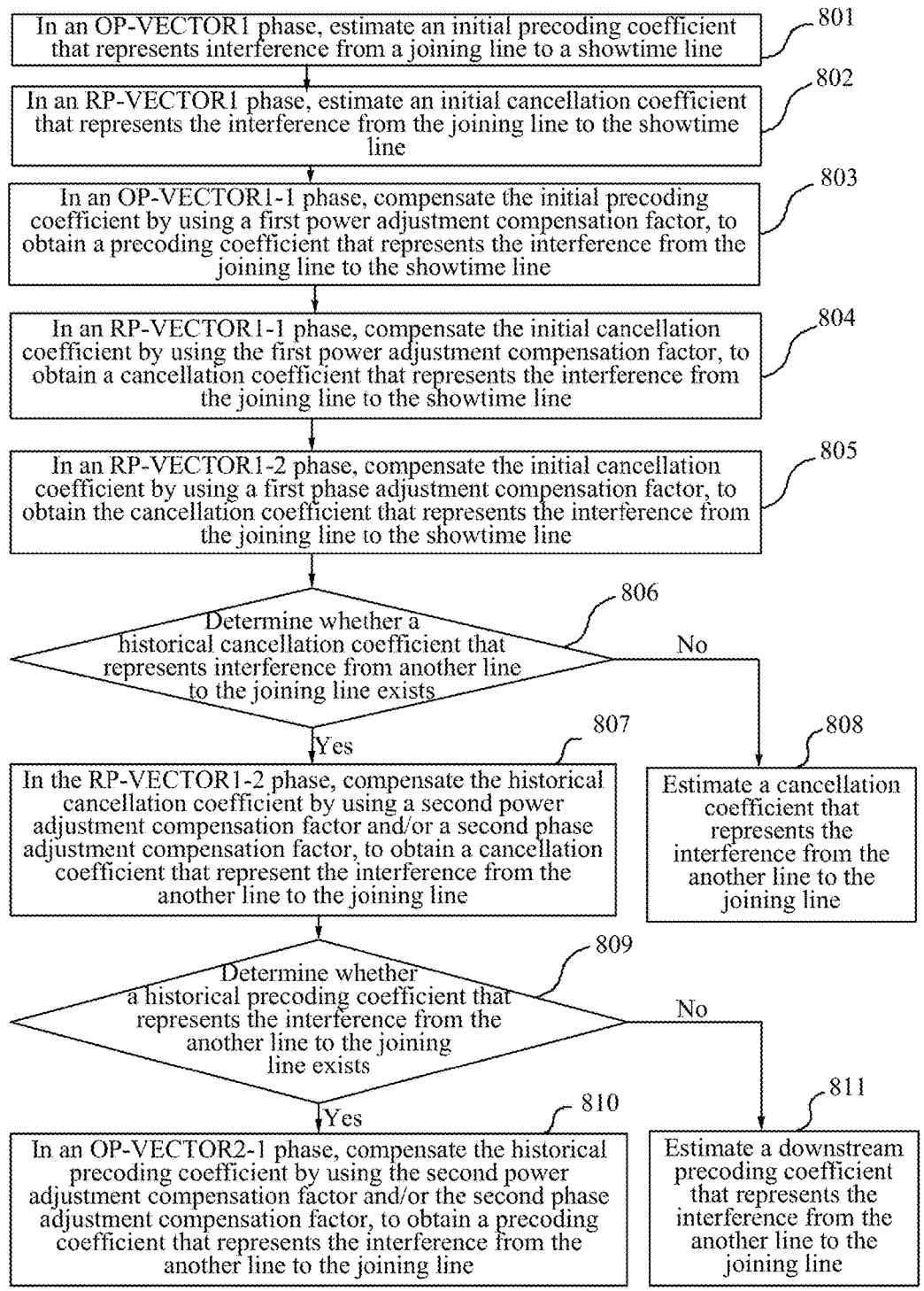
FIG. 9 is a schematic flowchart of yet another embodiment of a method for training a Vector coefficient of a Vectored-DSL according to the present invention.

FIG. 9 is a schematic flowchart of yet another embodiment of a method for training a Vector coefficient of a Vectored-DSL according to the present invention. In this embodiment, based on a procedure shown in FIG. 8, a compensation update manner is used to further determine a related coefficient that represents interference from another line to a joining line in an RP-VECTOR 1-2 phase and an OP-VECTOE2-1 phase, so as to further improve efficiency of Vector coefficient training.

Likewise, details of a procedure that is the same as a procedure in FIG. 8 are not described again in this embodiment, and only an improved part added in this embodiment is described in detail. As shown in FIG. 9, the method may include:

801. In an OP-VECTOR1 phase, estimate a precoding coefficient that represents interference from a joining line to a showtime line.

802. In an RP-VECTOR1 phase, estimate a cancellation coefficient that represents the interference from the joining line to the showtime line. In this case, the cancellation coefficient may be referred to as an initial cancellation coefficient.

803. In an OP-VECTOR 1-1 phase, compensate an initial precoding coefficient by using a first power adjustment compensation factor, to obtain a precoding coefficient that represents the interference from the joining line to the showtime line.

804. In an RP-VECTOR 1-1 phase, compensate the initial cancellation coefficient by using the first power adjustment compensation factor, to obtain a cancellation coefficient that represents the interference from the joining line to the showtime line.

805. In an RP-VECTOR 1-2 phase, compensate the initial cancellation coefficient by using a first phase adjustment compensation factor, to obtain the cancellation coefficient that represents the interference from the joining line to the showtime line.

806. Determine whether a historical cancellation coefficient that represents interference from another line to the joining line exists.

The joining line may have previously worked in a system, and therefore the system stores the historical cancellation coefficient that represents interference from another line to the joining line;

if the historical cancellation coefficient exists, step 807 is continued to be performed; otherwise, step 808 is performed.

807. In the RP-VECTOR 1-2 phase, compensate the historical cancellation coefficient by using a second power adjustment compensation factor and/or a second phase adjustment compensation factor, to obtain a cancellation coefficient that represents the interference from the another line to the joining line.

When the joining line is added to the system this time, signal power or signal phase of the joining line probably changes compared with a historical cancellation coefficient available when the joining line was on line before. Therefore, in this embodiment, based on the historical cancellation coefficient, compensation may be performed on the change by using the second power adjustment compensation factor and/or the second phase adjustment compensation factor, to obtain a correct coefficient without a need to perform a re-estimation.

The second power adjustment compensation factor and/or the second phase adjustment compensation factor refer/ refers to that it is required to determine whether the signal power or signal phase of the joining line changes. If both the signal power and the phase change, the second power adjustment compensation factor is used to perform power compensation and the second phase adjustment compensation factor is used to perform phase compensation; or if it is learned, by determining, that only the signal power changes, only the second power adjustment compensation factor is used to perform the power compensation; or, if only the signal phase changes, only the second phase adjustment compensation factor is used to perform the phase compensation.

In addition, because the joining line is a joining line and a related coefficient that represents interference from another line to the joining line may also be adjusted when channel tracking and update is performed on the joining line during subsequent normal working, compensation is optionally performed in a coefficient training phase in this step. Even if the signal power or signal phase of the joining line changes, whether the power or phase compensation is performed may also be randomly selected. For example, even if both the signal power and signal phase changes, only the phase compensation may be performed.

Specifically, the second power adjustment compensation factor and the second phase adjustment compensation factor can be determined in the following manner: Acquire a historical parameter and a current parameter of the joining line, where the parameter is used to determine a change of the signal power or signal phase of the joining line, and therefore the parameter includes a power parameter and a phase parameter, such as a TA, a PGA, or a frequency domain equalizer (frequency domain equalizer, FEQ for short), where the TA is a phase change parameter, the PGA is a power change parameter, and a parameter of the FEQ includes a change of the power and the phase, that is, both a change of the TA and a change of the PGA can be finally reflected in a change of the parameter of the FEQ. The second power adjustment compensation factor and the second phase adjustment compensation factor may be obtained by comparing a change of the foregoing parameter, and compensation is performed on the historical coefficient according to the second power adjustment compensation factor and the second phase adjustment compensation factor.

A compensation method that uses the TA and PGA parameter is the same as the compensation method in the foregoing embodiment, and details are not described again. If the FEQ is used to perform compensation, a new cancellation coefficient that represents the interference from the another line to the joining line is as follows, where a coefficient that represents interference from the showtime line to the joining line is used as an example:

$$W_{21}^{k,new} = W_{21}^{k,old} \cdot \frac{FEQ_2^{old}}{FEQ_2^{new}}, k = 1, 2, \ldots, N$$

808. In the RP-VECTOR 1-2 phase, estimate a cancellation coefficient that represents the interference from the another line to the joining line, where a regular estimation method is used.

809. Determine whether a historical precoding coefficient that represents the interference from the another line to the joining line exists.

The joining line may have previously worked in the system, so that the system stores the historical precoding coefficient that represents the interference from the another line to the joining line;

if the historical precoding coefficient exists, step 810 is continued to be performed; otherwise, step 811 is performed.

810. In an OP-VECTOR2-1 phase, compensate the historical precoding coefficient by using the second power adjustment compensation factor and/or the second phase adjustment compensation factor, to obtain a precoding coefficient that represents the interference from the another line to the joining line.

In this step, a method for determining whether the second power adjustment compensation factor or the second phase adjustment compensation factor is used and a method for performing corresponding compensation are the same as those shown in step 807. A method for using the TA and PGA parameter for compensation is the same as the compensation method in the foregoing embodiment, and details are not described again. If the FEQ is used to perform compensation, a new precoding coefficient that represents the interference from the another line to the joining line is as follows, where a coefficient that represents interference from the showtime line to the joining line is used as an example:

$$P_{21}^{k,new} = P_{21}^{k,old} \cdot \frac{FEQ_2^{old}}{FEQ_2^{new}}, k = 1, 2, \ldots, N$$

811. In the OP-VECTOR2-1 phase, estimate a downstream precoding coefficient that represents the interference from the another line to the joining line.

In this embodiment, after the VCE completes determining of the related coefficient that represents the interference from the joining line to the showtime line and determining of the related coefficient that represents the interference from the another line to the joining line, updating of a precoding matrix and a cancellation matrix after the joining line gets online is completed. The devices at both ends of the joining line enter a showtime working state, the joining line becomes a showtime line, and the VCE may perform FEXT cancellation processing on a signal during normal working according to the precoding matrix and the cancellation matrix.

According to the method for training a Vector coefficient in this embodiment, the compensation update manner is used in the RP-VECTOR1 phase and phases after the OP-VECTOR1 phase. Therefore, in an entire process for training a Vector coefficient, estimation needs to be performed only once when the training starts, and then all subsequent training phases can be skipped. The skip herein means that, unlike the prior art, a pilot estimation is not performed again, so that the process for training a Vector coefficient is greatly accelerated.

It should be noted that, in this embodiment, the compensation update method is used to compensate the historical coefficient in both the RP-VECTOR 1-2 phase and the OP-VECTOR2-1 phase; in a specific implementation, one of the phases may also be selected. For example, the compensation is performed only on the historical precoding coefficient, and a regular estimation method is still used to calculate the cancellation coefficient that represents the interference from the another line to the joining line; or, the compensation is performed only on the historical cancellation coefficient, and a regular estimation method is still used to calculate the precoding coefficient that represents the interference from the another line to the joining line.

In addition, in addition to the procedure listed in the foregoing embodiment, the following several manners may also be used. For example, in the entire process for training a Vector coefficient, a manner of compensating and updating the historical coefficient is used only in the RP-VECTOR 1-2 phase and the OP-VECTOR2-1 phase to obtain the related coefficient that represents the interference from the another line to the joining line, and the estimation method is still used in the remaining training phases; or, the compensation method is used in the OP-VECTOR 1-1 phase, the RP-VECTOR 1-1 phase, the RP-VECTOR 1-2 phase, and the OP-VECTOR2-1 phase, and the estimation method is still used in the RP-VECTOR 1-2 phase; or, the compensation method is used in the RP-VECTOR 1-2 phase, the RP-VECTOR 1-2 phase, and the OP-VECTOR2-1 phase, and the estimation method is used in the remaining phases. That is, compared with the prior art in which the estimation method is used in all phases, the compensation method may be used in any one of these several phases or any combination of these several phases, which can achieve a function of shortening training time.

Embodiment 6

Figure 10:
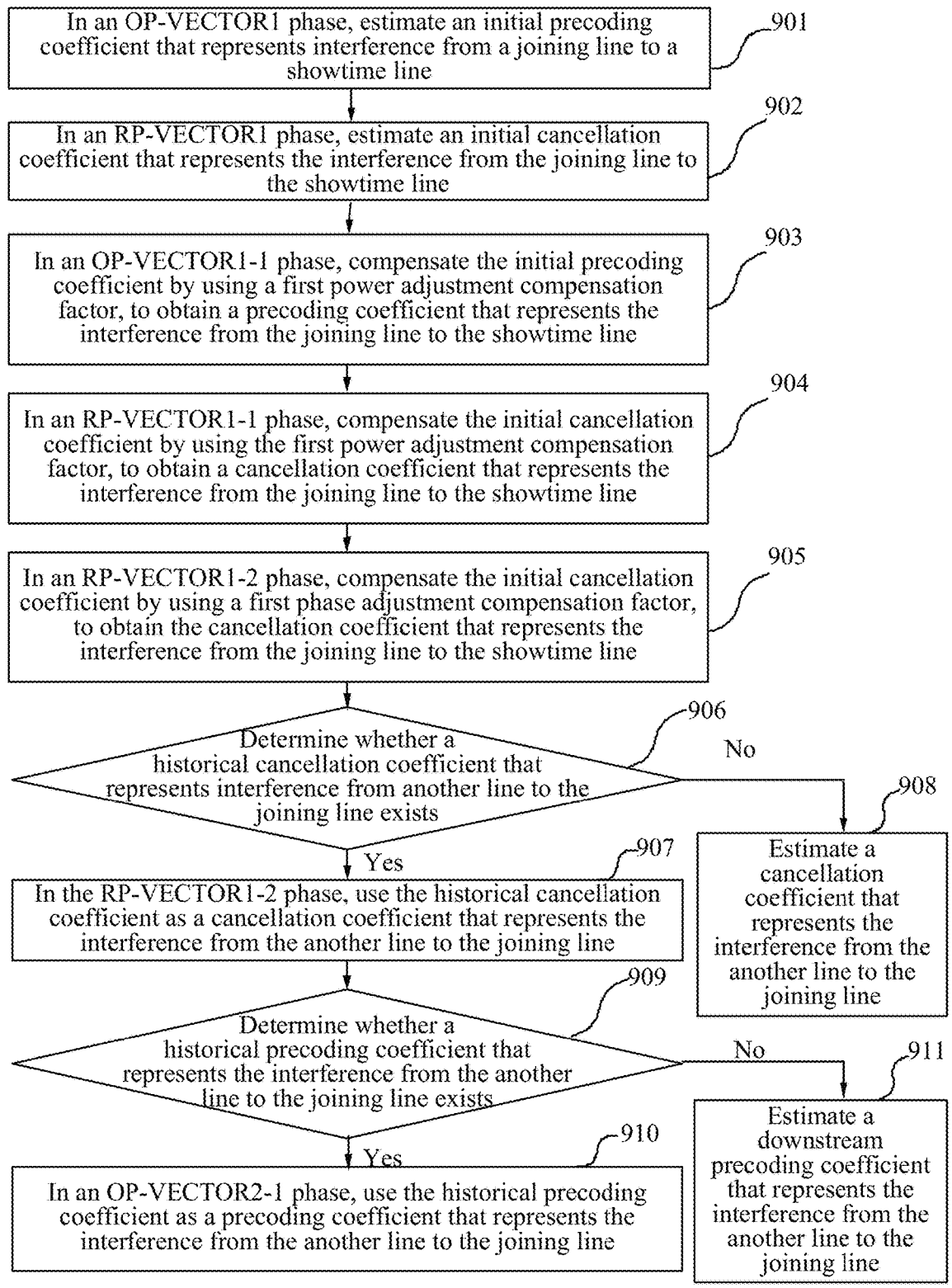
FIG. 10 is a schematic flowchart of yet another embodiment of a method for training a Vector coefficient of a Vectored-DSL according to the present invention.

FIG. 10 is a schematic flowchart of yet another embodiment of a method for training a Vector coefficient of a Vectored-DSL according to the present invention. A main difference between a procedure shown in FIG. 9 and that in this embodiment lies in step 907 and step 910, in which a historical precoding coefficient is directly used as a precoding coefficient that represents interference from another line to a joining line, and a historical cancellation coefficient is directly used as a cancellation coefficient that represents the interference from the another line to the joining line, and compensation is no longer performed. Steps except step 907 and step 910 are the same as corresponding steps in FIG. 9, and details are not described again.

In this embodiment, considering that the joining line is newly added to a system, after normal working, the foregoing related coefficient can be updated when channel tracking is performed on the joining line. In this case, a historical coefficient may be first used in a Vector coefficient training phase.

In addition, as mentioned in the foregoing, a historical coefficient may be used as a current coefficient in both an RP-VECTOR 1-2 phase and an OP-VECTOR2-1 phase or in any one of the phases. In addition, likewise, a manner in this embodiment may be combined with a manner used in any other phase of the Vector coefficient training or may be used independently. For example, a historical coefficient is only used as a current related coefficient that represents the interference from the another line to the joining line in the RP-VECTOR 1-2 phase and the OP-VECTORE2-1 phase, and an estimation method is still used in the remaining training phases; or, the method in this embodiment is used in the RP-VECTOR 1-2 phase and the RP-VECTOR 1-2 phase, and a compensation method is used in the OP-VECTOR2-1 phase, and the estimation method is used in the remaining phases, which are not described in detail again.

Embodiment 7

Figure 11:
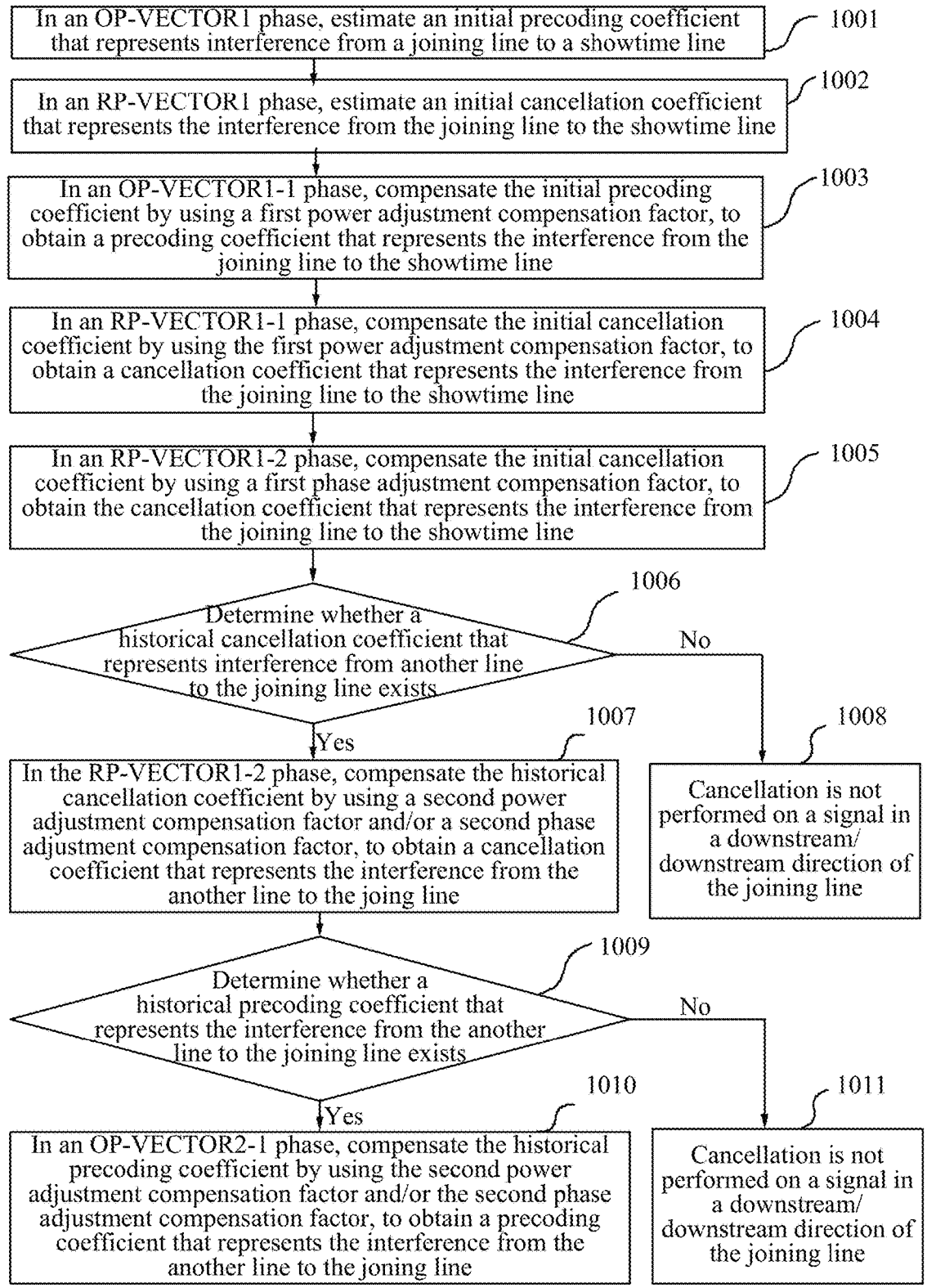
FIG. 11 is a schematic flowchart of yet another embodiment of a method for training a Vector coefficient of a Vectored-DSL according to the present invention.

FIG. 11 is a schematic flowchart of yet another embodiment of a method for training a Vector coefficient of a Vectored-DSL according to the present invention. A main difference between a procedure shown in FIG. 9 and that in this embodiment lies in step 1008 and step 1011, in which a manner that FEXT cancellation is not performed on a joining line is directly used, that is, in a precoding matrix and a cancellation matrix, a precoding coefficient and a cancellation coefficient that represent interference from another line to the joining line are set to zero. Actually, whether a historical coefficient exists may also not be determined; instead, cancellation processing on the joining line is directly skipped. Steps except step 1008 and step 1011 are the same as corresponding steps in FIG. 9, and details are not described again.

In this embodiment, considering that the joining line is newly added to a system, after normal working, the foregoing related coefficient can be updated when channel tracking is performed on the joining line. In this case, cancellation may temporarily not be performed in a Vector coefficient training phase.

In addition, as mentioned in the foregoing, multiple optional manners may also be used in specific implementation. For example, in an entire process for training a Vector coefficient, only in an RP-VECTOR 1-2 phase and OP-VECTOR2-1 phase, when a related coefficient that represents the interference from the another line to the joining line is determined, the coefficient is directly set to zero, that is, cancellation is not performed on the joining line, and an existing estimation method, such as a pilot estimation, is still used in another phase of the Vector coefficient training; or, a compensation method is used in an OP-VECTOR 1-1 phase and an RP-VECTOR 1-1 phase, cancellation is not performed on the joining line in the RP-VECTOR 1-2 phase the OP-VECTOR2-1 phase in this embodiment, and multiple manners such as the estimation method may still be used in another phase.

In the following Embodiment 9 and Embodiment 8, two optional procedures for training a Vector coefficient are illustrated, to present that improvement of phase 2 and phase 3 of the Vector coefficient training is relatively flexible in this embodiment of the present invention and multiple optional manners are available as long as the estimation method is not used for calculation in all phases.

Embodiment 8

Figure 12:
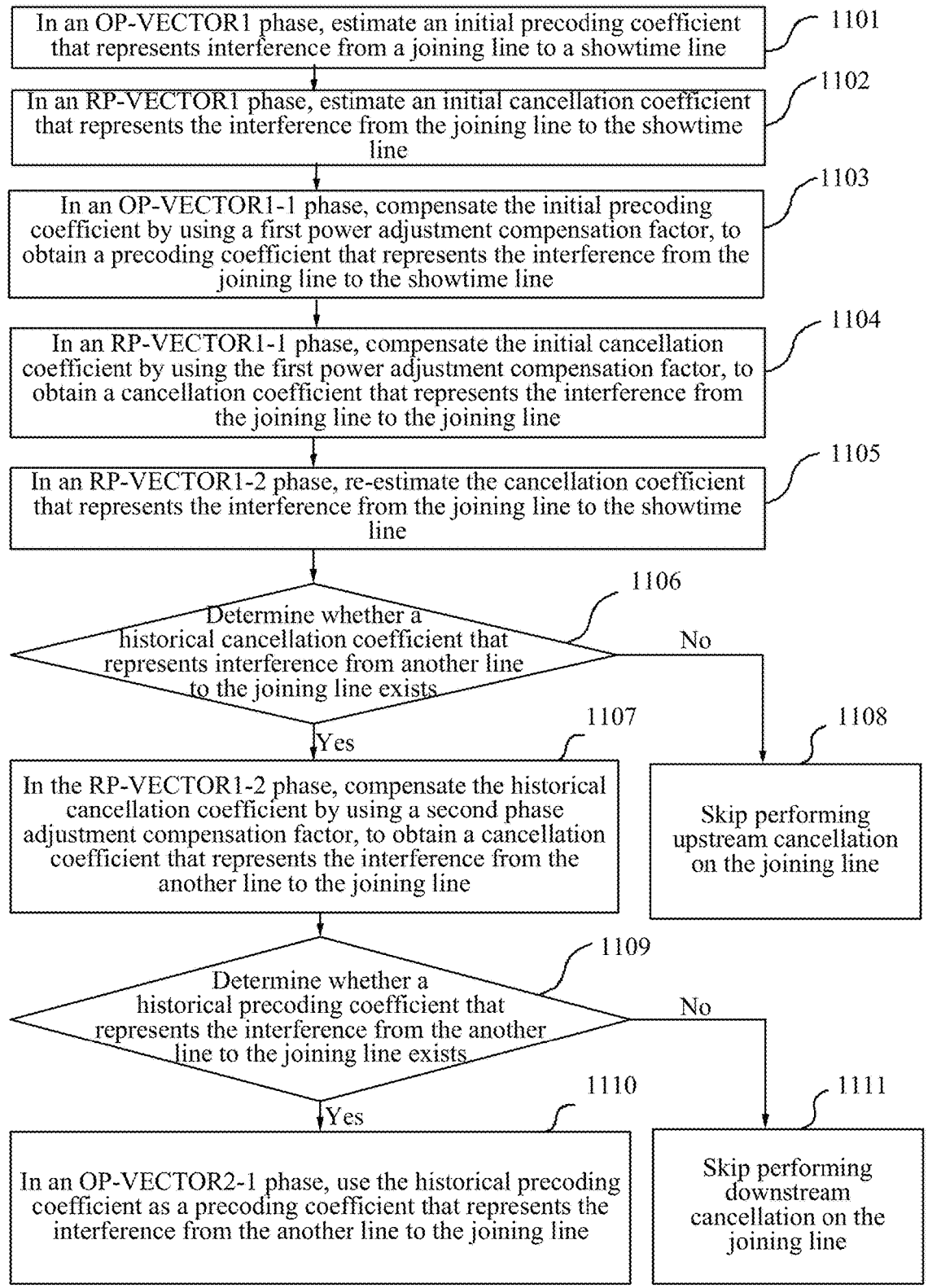
FIG. 12 is a schematic flowchart of yet another embodiment of a method for training a Vector coefficient of a Vectored-DSL according to the present invention.

FIG. 12 is a schematic flowchart of yet another embodiment of a method for training a Vector coefficient of a Vectored-DSL according to the present invention. As shown in FIG. 12, in Vector coefficient training according to this embodiment:

Referring to 1103 and 1104, a compensation update manner is used in both an OP-VECTOR 1-1 phase and an RP-VECTOR 1-1 phase;

Referring to 1105, an estimation method is used to calculate an upstream cancellation coefficient that represents interference from a joining line to a showtime line in an RP-VECTOR 1-2 phase;

Referring to 1107, a cancellation coefficient that represents interference from another line to the joining line is obtained by compensating an upstream historical cancellation coefficient of the joining line;

Referring to 1110, a historical precoding coefficient is directly used as a current precoding coefficient that represents the interference from the another line to the joining line; and Referring to 1108 and 1111, when there is no historical coefficient that represents the interference from the another line to the joining line, cancellation is not performed on the joining line.

Other steps are the same as corresponding steps in FIG. 9, and details are not described again.

Embodiment 9

Figure 13:
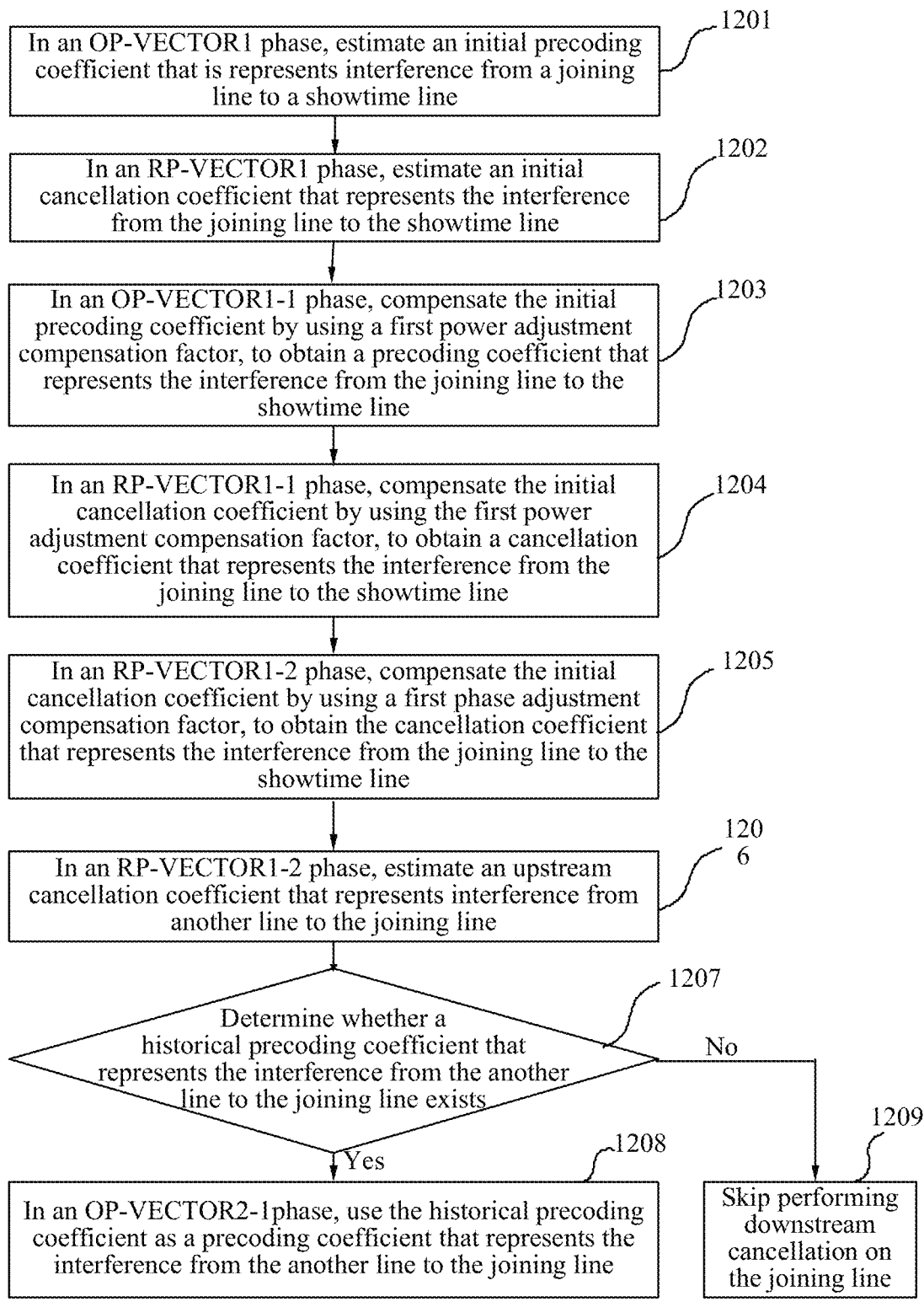
FIG. 13 is a schematic flowchart of yet another embodiment of a method for training a Vector coefficient of a Vectored-DSL according to the present invention.

FIG. 13 is a schematic flowchart of yet another embodiment of a method for training a Vector coefficient of a Vectored-DSL according to the present invention. As shown in FIG. 13, in Vector coefficient training according to this embodiment:

Referring to 1203 to 1205, a compensation method is used to update a precoding coefficient or a cancellation coefficient that represents interference from a joining line to a showtime line;

Referring to 1206, in an RP-VECTOR 1-2 phase, a regular estimation method is used to calculate an upstream cancellation coefficient that represents interference from another line to the joining line;

Referring to 1208, in an OP-VECTOR2-1 phase, a historical precoding coefficient is directly used as a current precoding coefficient that represents the interference from the another line to the joining line; and Referring to 1209, when there is no historical precoding coefficient that represents the interference from another line to the joining line, a signal in a downstream direction of the joining line.

Other steps are the same as corresponding steps in FIG. 9, and details are not described again.

Embodiment 10

An embodiment provides an apparatus for training a Vector coefficient of a vectored digital subscriber line Vectored-DSL. The apparatus is, for example, a VCE, where the VCE may transfer a related coefficient determined in a process for training a Vector coefficient, such as a precoding coefficient and a cancellation coefficient, to a canceller inside the VCE, and then the canceller may perform processing on a signal according to the coefficient, for example, send a downstream signal after performing FEXT cancellation processing on a downstream signal according to the precoding coefficient, or perform FEXT cancellation processing on a received upstream signal according to the cancellation coefficient. The apparatus may execute a method for training a Vector coefficient in any embodiment of the present invention.

Figure 14:
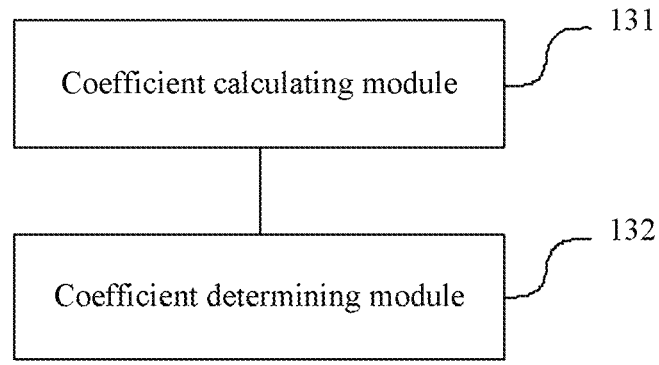
FIG. 14 is a schematic structural diagram of an embodiment of an apparatus for training a Vector coefficient of a Vectored-DSL according to the present invention.

FIG. 14 is a schematic structural diagram of an embodiment of an apparatus for training a Vector coefficient of a Vectored-DSL according to the present invention. As shown in FIG. 14, the apparatus may include: a coefficient calculating module 131 and a coefficient determining module 132, where the coefficient calculating module 131 is configured to: after a handshake phase is executed for a joining line, calculate, by using a pilot estimation method, an initial precoding coefficient and an initial cancellation coefficient that represent interference from the joining line to a normal working line; and the coefficient determining module 132 is configured to: after a channel discovery phase is executed for the joining line, compensate the initial precoding coefficient and the initial cancellation coefficient by using a compensation factor, to obtain a precoding coefficient and a cancellation coefficient that represent the interference from the joining line to the normal working line, where the compensation factor is obtained according to a signal power change or a signal phase change of the joining line.

Figure 15:
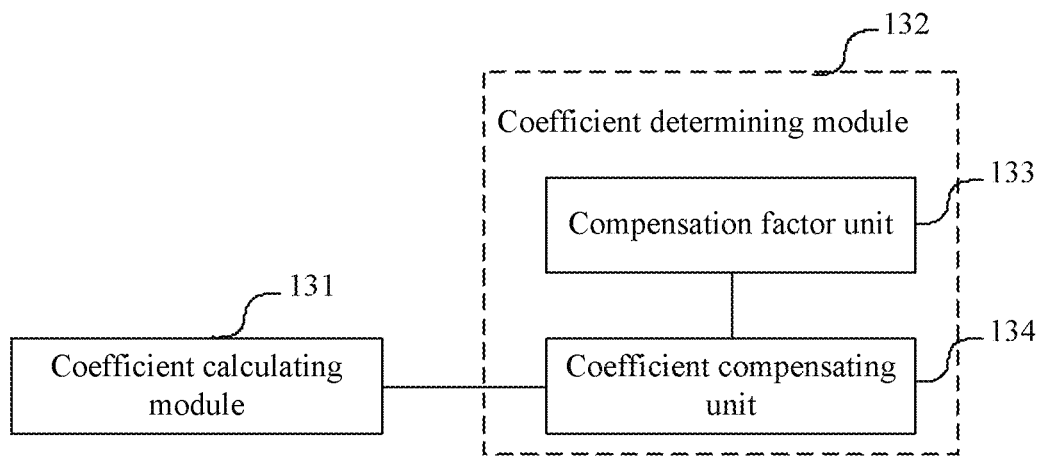
FIG. 15 is a schematic structural diagram of another embodiment of an apparatus for training a Vector coefficient of a Vectored-DSL according to the present invention.

FIG. 15 is a schematic structural diagram of another embodiment of an apparatus for training a Vector coefficient of a Vectored-DSL according to the present invention. As shown in FIG. 15, the apparatus is based on the structure shown in FIG. 14, and the coefficient determining module 132 includes: a compensation factor unit 133 and a coefficient compensating unit 134, where the compensation factor unit 133 is configured to obtain a first power adjustment compensation factor according to a signal power change of the joining line occurring before the channel discovery phase and after the channel discovery phase; and the coefficient compensating unit 134 is configured to separately compensate the initial precoding coefficient and the initial cancellation coefficient by using the first power adjustment compensation factor that is determined by the compensation factor unit, to obtain a precoding coefficient and a cancellation coefficient that represent the interference from the joining line to the normal working line.

Further, the compensation factor unit 133 is further configured to obtain a first phase adjustment compensation factor according to a signal phase change of the joining line occurring before the training phase and after the training phase; and the coefficient compensating unit 134 is further configured to compensate the initial cancellation coefficient by using the first phase adjustment compensation factor, to obtain a cancellation coefficient that represents the interference from the joining line to the normal working line.

Figure 16:
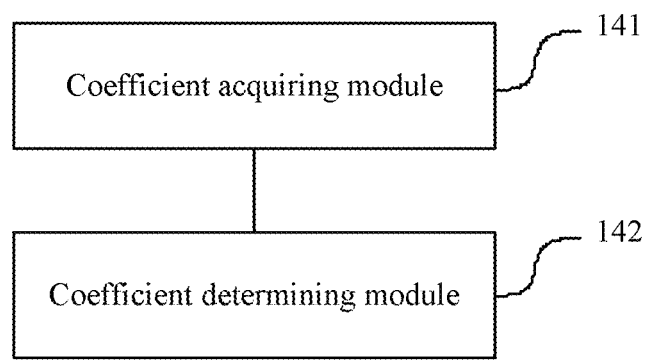
FIG. 16 is a schematic structural diagram of yet another embodiment of an apparatus for training a Vector coefficient of a Vectored-DSL according to the present invention.

FIG. 16 is a schematic structural diagram of yet another embodiment of an apparatus for training a Vector coefficient of a Vectored-DSL according to the present invention. As shown in FIG. 16, the apparatus may include: a coefficient acquiring module 141 and a coefficient determining module 142, where the coefficient acquiring module 141 is configured to: after a training phase is executed for a joining line, acquire a historical precoding coefficient and a historical cancellation coefficient that represent interference from another line to the joining line; and the coefficient determining module 142 is configured to compensate the historical precoding coefficient and the historical cancellation coefficient by using a compensation factor, to obtain a precoding coefficient and a cancellation coefficient that represent the interference from the another line to the joining line, where the compensation factor is obtained according to a change between a current parameter of the joining line and a historical parameter of the joining line, and the parameter includes a power parameter and a phase parameter.

Figure 17:
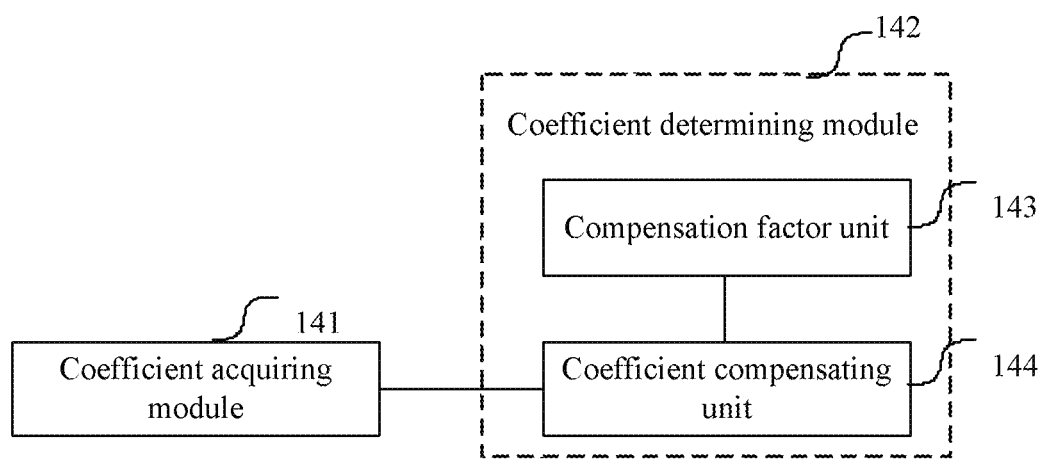
FIG. 17 is a schematic structural diagram of yet another embodiment of an apparatus for training a Vector coefficient of a Vectored-DSL according to the present invention.

FIG. 17 is a schematic structural diagram of yet another embodiment of an apparatus for training a Vector coefficient of a Vectored-DSL according to the present invention. As shown in FIG. 17, the apparatus is based on the structure shown in FIG. 16, and the coefficient determining module 142 includes: a compensation factor unit 143 and a coefficient compensating unit 144, where the compensation factor unit 143 is configured to obtain a second power adjustment compensation factor according to a change between a current power parameter of the joining line and a historical power parameter of the joining line, and obtain a second phase adjustment compensation factor according to a change between a current phase parameter of the joining line and a historical phase parameter of the joining line; and the coefficient compensating unit 144 is configured to compensate the historical precoding coefficient by using the second power adjustment compensation factor and/or the second phase adjustment compensation factor, to obtain the precoding coefficient that represents interference from the another line to the joining line; and/or compensate the historical cancellation coefficient by using the second power adjustment compensation factor and/or the second phase adjustment compensation factor, to obtain the cancellation coefficient that represents interference from the another line to the joining line.

Further, a specific processing procedure of the foregoing modules or units may be performed according to a manner recorded in the embodiment of the foregoing manner.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for training a Vector coefficient of a vectored digital subscriber line Vectored-DSL, comprising:
   after a handshake phase is executed for a joining line, calculating, by using a pilot estimation method, an initial precoding coefficient and an initial cancellation coefficient that represent interference from the joining line to a normal working line; and
   after a channel discovery phase is executed for the joining line, compensating the initial precoding coefficient and the initial cancellation coefficient by using a compensation factor, to obtain a precoding coefficient and a cancellation coefficient that represent the interference from the joining line to the normal working line, wherein the compensation factor is obtained according to a signal power change or a signal phase change of the joining line.

2. The method for training a Vector coefficient of a Vectored-DSL according to claim 1, wherein before a training phase is executed for the joining line, the compensating the initial precoding coefficient and the initial cancellation coefficient by using a compensation factor comprises:
   separately compensating the initial precoding coefficient and the initial cancellation coefficient by using a first power adjustment compensation factor, to obtain the precoding coefficient and the cancellation coefficient that represent the interference from the joining line to the normal working line, wherein
   the first power adjustment compensation factor is obtained according to a signal power change of the joining line occurring before the channel discovery phase and after the channel discovery phase.

3. The method for training a Vector coefficient of a Vectored-DSL according to claim 1, wherein after the training phase is executed for the joining line, the compensating the initial precoding coefficient and the initial cancellation coefficient by using a compensation factor comprises:
   compensating the initial cancellation coefficient by using a first phase adjustment compensation factor, to obtain the cancellation coefficient that represents the interference from the joining line to the normal working line, wherein the first phase adjustment compensation factor is obtained according to a signal phase change of the joining line occurring before the training phase and after the training phase.

4. The method for training a Vector coefficient of a vectored digital subscriber line Vectored-DSL according to claim 1, further comprising:
   after a training phase is executed for a joining line, acquiring a historical precoding coefficient and a historical cancellation coefficient that represent interference from another line to the joining line; and
   compensating the historical precoding coefficient and the historical cancellation coefficient by using a compensation factor, to obtain a precoding coefficient and a cancellation coefficient that represent the interference from the another line to the joining line, wherein the compensation factor is obtained according to a change between a current parameter of the joining line and a historical parameter of the joining line, and the parameter comprises a power parameter and a phase parameter.

5. The method for training a Vector coefficient of a Vectored-DSL according to claim 4, wherein the compensating the historical precoding coefficient and the historical cancellation coefficient by using a compensation factor comprises:
   compensating the historical precoding coefficient by using a second power adjustment compensation factor and/or a second phase adjustment compensation factor, to obtain the precoding coefficient that represents the interference from the another line and the joining line; and/or
   compensating the historical cancellation coefficient by using a second power adjustment compensation factor and/or a second phase adjustment compensation factor, to obtain the cancellation coefficient that represents the interference from the another line and the joining line, wherein
   the second power adjustment compensation factor is obtained according to a change between a current power parameter of the joining line and a historical power parameter of the joining line, and the second phase adjustment compensation factor is obtained according to a change between a current phase parameter of the joining line and a historical phase parameter of the joining line.

6. The method for training a Vector coefficient of a Vectored-DSL according to claim 4, wherein after the training phase is executed for the joining line, the method further comprises:
   compensating, by using a first phase adjustment compensation factor, an initial cancellation coefficient that represents interference from the joining line to a normal working line, to obtain a cancellation coefficient that represents the interference from the joining line to the normal working line, wherein the initial cancellation coefficient is obtained by calculation after a handshake phase is executed for the joining line, wherein
   the first phase adjustment compensation factor is obtained according to a signal phase change of the joining line occurring before the training phase and after the training phase.

7. The method for training a Vector coefficient of a Vectored-DSL according to claim 4, wherein after a channel discovery phase is executed and before the training phase is executed for the joining line, the method further comprises:
   separately compensating, by using a first power adjustment compensation factor, an initial precoding coefficient and an initial cancellation coefficient that represent the interference from the joining line to the normal working line, to obtain a precoding coefficient and a cancellation coefficient that represent the interference from the joining line to a normal working line, wherein the initial precoding coefficient and the initial cancellation coefficient are obtained after the handshake phase is executed for the joining line, wherein
   the first power adjustment compensation factor is obtained according to a signal power change of the joining line occurring before the channel discovery phase and after the channel discovery phase.

8. An apparatus for training a Vector coefficient of a vectored digital subscriber line Vectored-DSL, comprising:
   a coefficient calculating module, configured to: after a handshake phase is executed for a joining line, calculate, by using a pilot estimation method, an initial precoding coefficient and an initial cancellation coefficient that represent interference from the joining line to a normal working line; and
   a coefficient determining module, configured to: after a channel discovery phase is executed for the joining line, compensate the initial precoding coefficient and the initial cancellation coefficient by using a compensation factor, to obtain a precoding coefficient and a cancellation coefficient that represent the interference from the joining line to the normal working line, wherein the compensation factor is obtained according to a signal power change or a signal phase change of the joining line.

9. The apparatus for training a Vector coefficient of a Vectored-DSL according to claim 8, wherein the coefficient determining module comprises:
   a compensation factor unit, configured to obtain a first power adjustment compensation factor according to a signal power change of the joining line occurring before the channel discovery phase and after the channel discovery phase; and
   a coefficient compensating unit, configured to separately compensate the initial precoding coefficient and the initial cancellation coefficient by using the first power adjustment compensation factor that is determined by the compensation factor unit, to obtain the precoding coefficient and the cancellation coefficient that represent the interference from the joining line to the normal working line.

10. The apparatus for training a Vector coefficient of a Vectored-DSL according to claim 8, wherein:
    the compensation factor unit is further configured to obtain a first phase adjustment compensation factor according to a signal phase change of the joining line occurring before a training phase and after the training phase; and
    the coefficient compensating unit is further configured to compensate the initial cancellation coefficient by using the first phase adjustment compensation factor, to obtain the cancellation coefficient that represents the interference from the joining line to the normal working line.

11. The apparatus for training a Vector coefficient of a vectored digital subscriber line Vectored-DSL according to claim 8, further comprising:
    a coefficient acquiring module, configured to: after a training phase is executed for a joining line, acquire a historical precoding coefficient and a historical cancellation coefficient that represent interference from another line to the joining line; and wherein the coefficient determining module is further configured to compensate the historical precoding coefficient and the historical cancellation coefficient by using a compensation factor, to obtain a precoding coefficient and a cancellation coefficient that represent the interference from the another line to the joining line, wherein the compensation factor is obtained according to a change between a current parameter of the joining line and a historical parameter of the joining line, and the parameter comprises a power parameter and a phase parameter.

12. The apparatus for training a Vector coefficient of a Vectored-DSL according to claim 11, wherein the coefficient determining module comprises:

a compensation factor unit, configured to obtain a second power adjustment compensation factor according to a change between a current power parameter of the joining line and a historical power parameter of the joining line, and obtain a second phase adjustment compensation factor according to a change between a current phase parameter of the joining line and a historical phase parameter of the joining line; and a coefficient compensating unit, configured to compensate the historical precoding coefficient by using the second power adjustment compensation factor and/or the second phase adjustment compensation factor, to obtain the precoding coefficient that represents the interference from the another line to the joining line; and/or compensate the historical cancellation coefficient by using the second power adjustment compensation factor and/or the second phase adjustment compensation factor, to obtain the cancellation coefficient that represents the interference from the another line to the joining line.

* * * * *